United States Patent [19]

Yanagi

[11] Patent Number: 5,163,033
[45] Date of Patent: Nov. 10, 1992

[54] TRACK ACCESS CONTROL SYSTEM IN ROTATING DISC DEVICES WITH ECCENTRICITY CORRECTION

[75] Inventor: Shigenori Yanagi, Kawasaki, Japan
[73] Assignee: Fujitsu Limited, Kawasaki, Japan
[21] Appl. No.: 507,672
[22] Filed: Apr. 10, 1990

[30] Foreign Application Priority Data

Apr. 10, 1989 [JP] Japan ................................. 1-090022
Apr. 10, 1989 [JP] Japan ................................. 1-090023
Apr. 10, 1989 [JP] Japan ................................. 1-090025

[51] Int. Cl.$^5$ .............................................. G11B 7/00
[52] U.S. Cl. .................................. 369/32; 369/44.28; 369/44.11
[58] Field of Search ............... 369/32, 44.27, 44.28, 369/44.29, 44.37, 44.14, 44.34, 44.32, 44.11, 44.13; 360/77.04, 44.33, 110, 112

[56] References Cited

U.S. PATENT DOCUMENTS

| 4,907,214 | 3/1990 | Nagano et al. .................... 369/49 |
| 4,982,393 | 1/1991 | Matsushita et al. .............. 369/44.32 |
| 5,034,941 | 7/1991 | Kasai et al. ..................... 369/44.37 |

FOREIGN PATENT DOCUMENTS

1-184732  7/1989  Japan .
1-189036  7/1989  Japan .
1-205733  8/1989  Japan .

OTHER PUBLICATIONS

Nikkei Mechanical 1987, Jul. 13, pp. 66–79.
U.S. application, Ser. No. 299,018 (filed on Jan. 19, 1989).

Primary Examiner—Roy N. Envall, Jr.
Assistant Examiner—Nabil Hindi
Attorney, Agent, or Firm—Staas & Halsey

[57] ABSTRACT

A track access control system in a rotating disc storage device includes a data writing/reading head which is movable in a radial direction of a rotating disc; and an impinging beam moving mechanism which is mounted on the data writing/reading head, for moving am impinging position of the optical beam for the data writing/reading, on the data writing/reading head. A relative position of the impinging beam on the disc from an optimum position is detected. The position of the head is controlled in response to a low frequency component of the above detected deviation, and the operation of the impinging beam moving mechanism is controlled in response to a high frequency component of the above detected deviation, so that the deviation is reduced during a track servo operation. A waveform memorizing circuit records a waveform of the movement of the head during a track servo operation. A track jump control mechanism moves the head and the above relative position of the impinging beam, so that the position of the impinging beam moves to a requested track. During the track jump operation, control quantities to move the head and the above relative position of the impinging beam is modified by adding the above recorded data of the waveform memorizing circuit thereto, corresponding to a current rotation angle of the disc. Further, when an erasing beam outputting unit is mounted on the head, a displacement of an outputting position of the erasing beam on the head from a predetermined position, is memorized during a track servo operation, and is added in the above modification during the track jump operation.

25 Claims, 31 Drawing Sheets

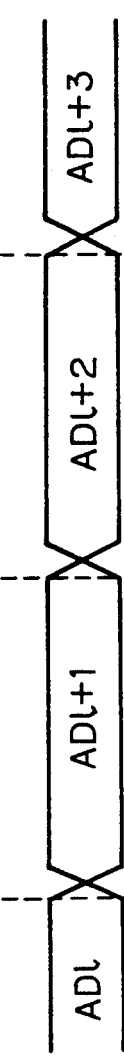
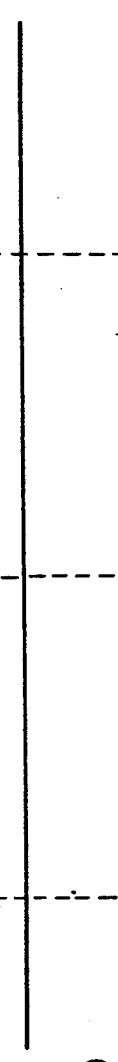
Fig. 13A CLK
Fig. 13B RCO
Fig. 13C TCL
Fig. 13D ADD
Fig. 13E WRM
Fig. 13F $\overline{WE}$
Fig. 13G DO
Fig. 13H DQ Fig. 14B Din
Fig. 14C WE

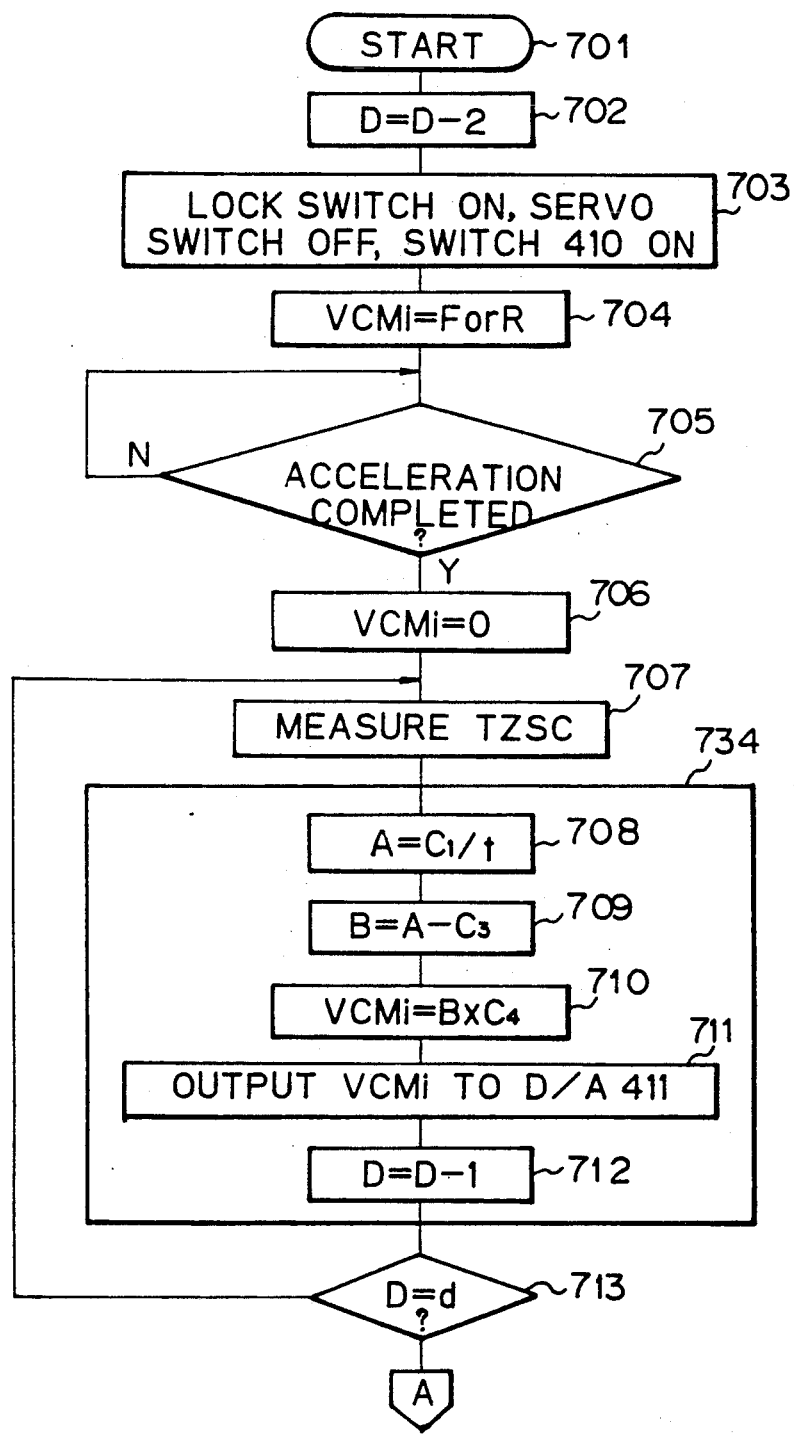

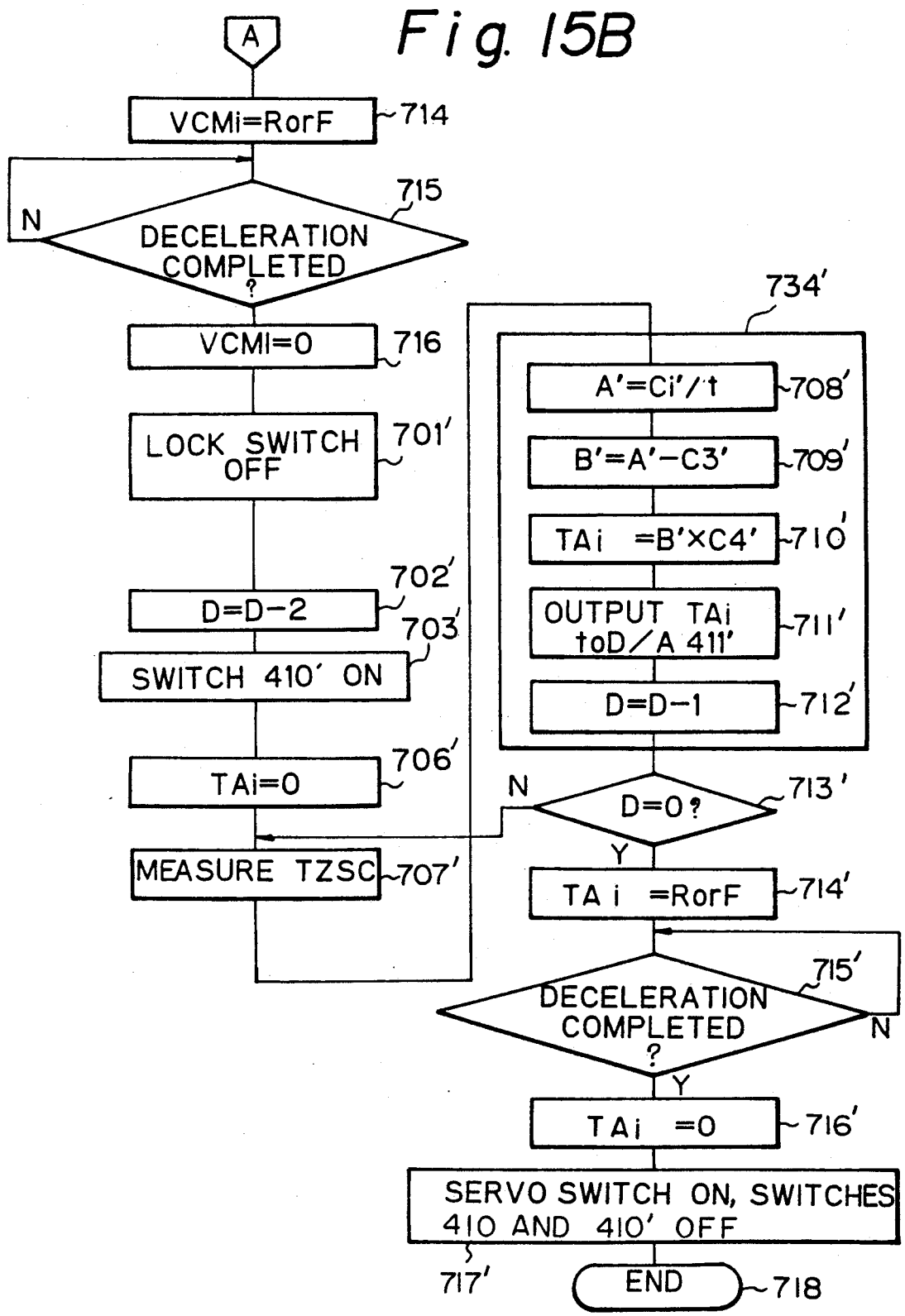

| Fig.18A | Fig.18B |

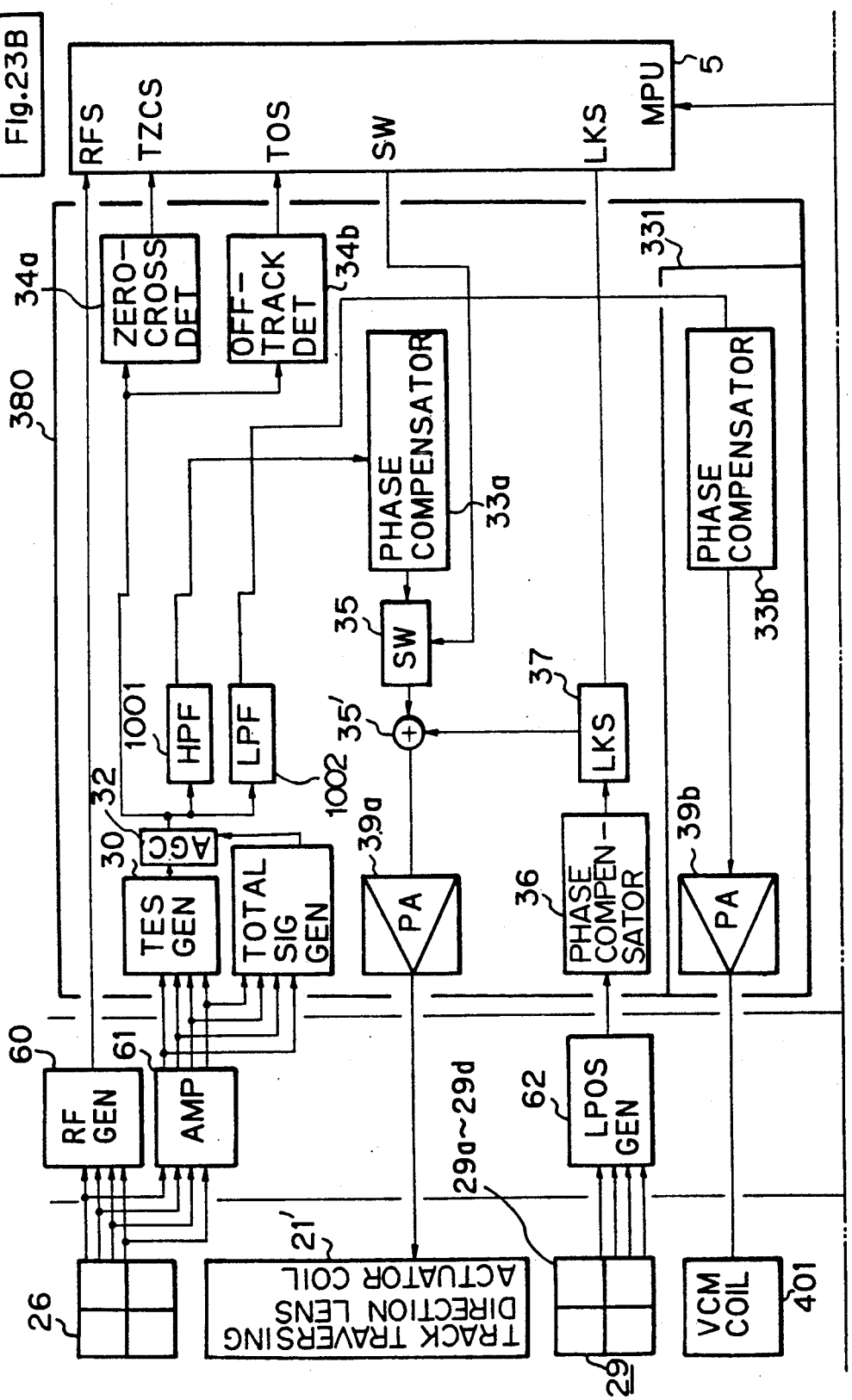

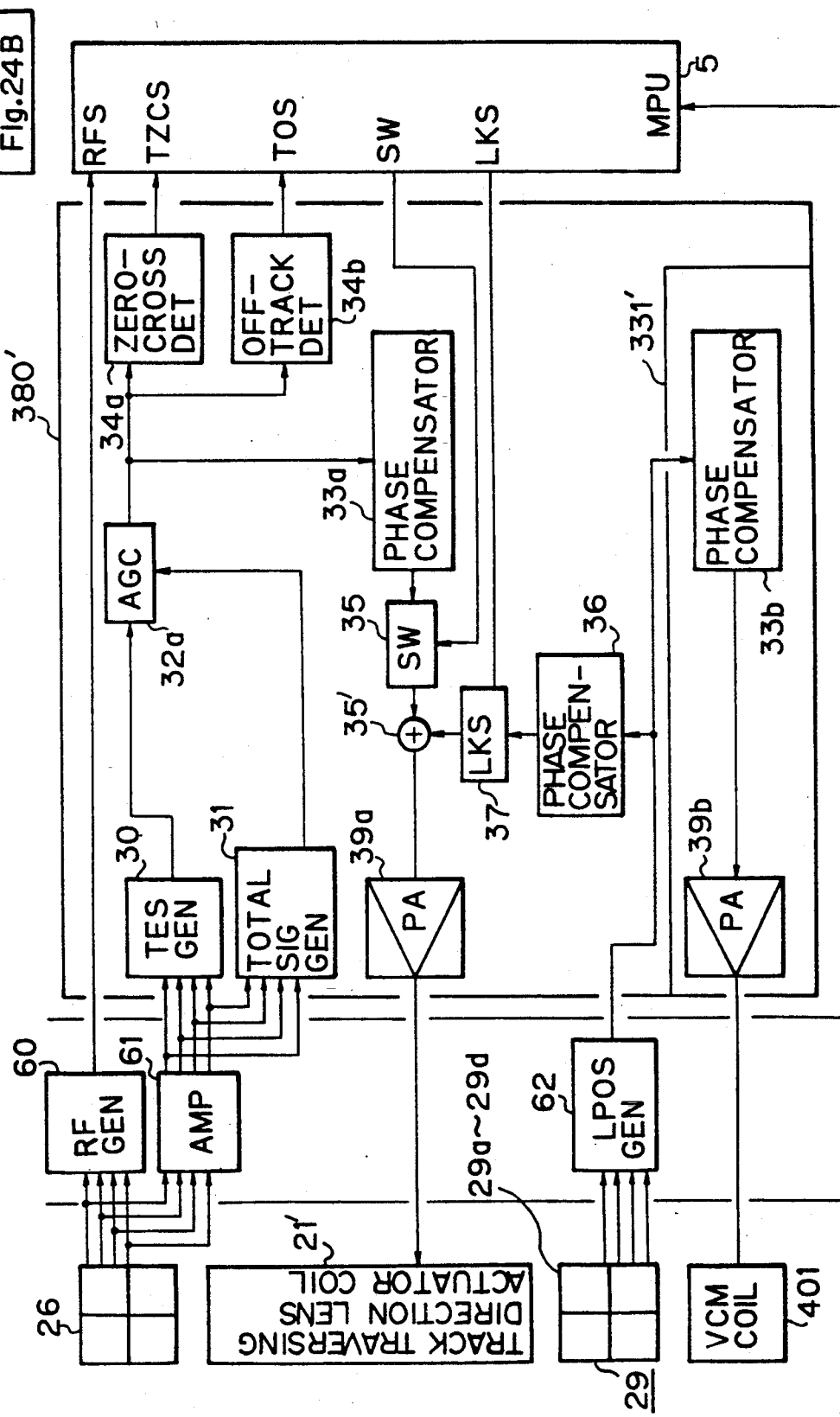

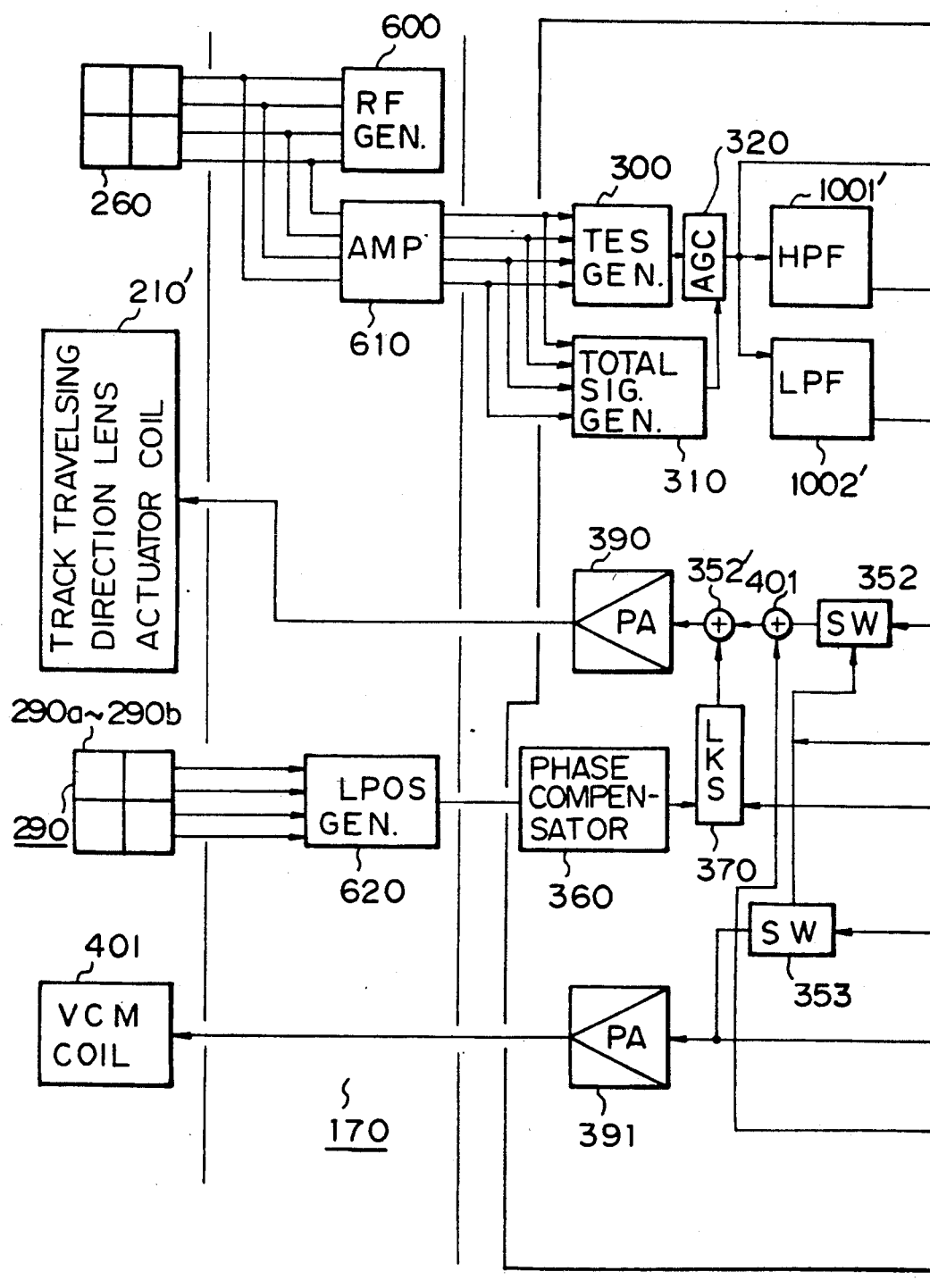

TRACK ACCESS CONTROL SYSTEM IN ROTATING DISC DEVICES WITH ECCENTRICITY CORRECTION

BACKGROUND OF THE INVENTION

1. Field of the Invention

The present invention relates to a track access control system in rotating disc devices. The present invention relates, in particular, to a track access and servo control system in optical magneto-optical disc devices.

Optical discs and magneto-optical discs are used as a large capacity external memories for their large data recording density. The optical discs and magneto-optical discs have narrow (typically 1.6 μm width) tracks which are preformed spirally or concentrically on their surface, and each bit of data is recorded on a portion of a track.

In particular, in the magneto-optical discs, data is recorded as a state of magnetization in each portion of the tracks, and therefore new data can be written over a portion of a disc where the previously written data is recorded thereon. There are two types of magneto-optical discs depending on the types of the magnetic medium, one is overwritable and the other is non-overwritable. In the non-overwritable magneto-optical discs, an erasing operation is necessary before each writing operation.

Each bit of data is written on a portion of a track surface by impinging a high-intensity optical (light) beam onto the track surface for changing or not changing a magnetization state of the portion, and is read by impinging a low-intensity optical beam onto the track surface, and then detecting the polarization of an optical beam reflected at the track surface, where the polarization is caused by the magnetization state of the portion of the track at which the optical beam is reflected.

Generally, to carry out effective and accurate writing and reading operations, the optical beam impinged onto the track surface is required to exactly follow the track surface. To exactly follow the track, a track servo system is provided. Further, generally, when a data writing or reading command is received, the beam position is moved to the object track position, i.e., a track seek operation is carried out. In the seek operation, a velocity in moving the beam position and the time for moving the beam position are calculated, and a current for driving a motor to move the beam position, is given to the motor so that the motor is moved in the calculated velocity for the calculated duration.

However, in the current manufacturing technique of optical discs and magneto-optical discs, eccentricity of the tracks is inevitable; typically, the radius of a track varies in the range of about 50 μm. Since the range of the variation of the radius is much larger than the track width, the eccentricity degrades the accuracy of the track jump operation, i.e., the eccentricity may lead to a track which is different from the target track depending on the phase in the rotation of the disc in the jump operation. The mislead in the track jump operation makes the operation unstable, and delays the track seek operation, and thus increases a total access time.

Further, the eccentricity of the tracks causes an instability in a track servo operation for maintaining the beam spot at an optimum position of an objective track on an optical disc or a magneto-optical disc.

2 Description of the Related Art

Nikkei Mechanical 1987, 7/13, pp. 73 (in Japanese) proposed a technique to correct the above mislead in the seek operation. In the proposed technique, first, the variation of the position of the track is measured by the optical position sensor, and is approximated as a sinusoidal waveform and is tabulated in a memory. In a track access operation, the deviation of the position of the track is read from the memory corresponding to the rotation angle (phase), is transformed to an analog signal, and is added to the position command for controlling the voice coil motor which moves an optical head.

However, in the above technique, the operation for memorizing a position information of the track in the approximated sinusoidal form, imposes a heavy load on the processor, and, in practice, the deformation of tracks cannot be necessarily approximated by a sinusoidal form.

U.S. application, Ser. No. 299,018 (filed on Jan. 19, 1989) discloses a track servo control system, wherein a variation of a track position signal due to the eccentricity of a track is detected and memorized in a memory. The memorized variation data is added to a control signal to drive a track actuator in the track servo loop. However, this technique does not provide a means to solve the above mislead in the track seek operation.

SUMMARY OF THE INVENTION

An object of the present invention is to provide a track access system wherein accuracy and stability of a track jump operation is improved, and a total access time is reduced.

Another object of the present invention is to provide a track access system wherein accuracy and stability of a track servo operation is improved.

According to a first aspect of the present invention, there is provided a track access control system in a rotating disc storage device including a rotatable recording disc having a plurality of tracks which are formed in a direction of the rotation of the disc, and a data writing/reading head which impinges an optical beam onto the recording disc, and is movable in a radial direction across the disc, comprising: a head moving unit for moving the data writing/reading head; an impinging beam moving mechanism, mounted on the data writing/reading head, for moving an impinging position of the optical beam, on the data writing/reading head; a track error detecting unit for detecting a deviation of the position of the impinging beam on the recording disc, from an optimum on-track position; a first driving control unit for outputting a first control quantity to control the operation of the head moving unit responding to the output of the track error detecting unit so that the deviation is reduced during a track servo operation; a second driving control unit for outputting a second control quantity to control the operation of the impinging beam moving unit responding to the output of the track error detecting unit so that the deviation is reduced during a track servo operation; a waveform memorizing unit for recording a waveform of the output of the first control quantity for a rotation cycle of the recording disc; a track jump control unit for outputting a third control quantity to control the head moving unit and the impinging beam moving unit so that the position of the impinging beam moves to a requested track; and a jump control signal modifying unit for modifying the third control quantity by adding the recorded data of the waveform memorizing unit, corresponding to a current rotation angle of the recording disc thereto, during the track jump operation.

Alternatively, the above track access control system according to the first embodiment of the present invention further comprises a beam displacement detecting unit for detecting a displacement of an outputting position of the optical beam from a predetermined position on the data writing/reading head; and the above first driving control unit outputs the first control quantity to control the operation of the head moving unit responding to the output of the beam displacement detecting unit, instead of the output of the track error detecting unit, so that the displacement is reduced during a track servo operation.

According to a second aspect of to the present invention, there is provided a track access control system in a rotating disc storage device including a rotatable disc having a plurality of tracks which are formed in a direction of the rotation of the disc, and a movable head which is movable in a radial direction across the disc for writing or reading data on the disc. The movable head contains an erasing unit for erasing data which is written on a track of the disc by impinging an erasing beam, and a data writing/reading unit for writing or reading data on the track by impinging a writing beam or reading beam, where the erasing means is located in the position preceding to the data writing/reading means in the direction of the rotation of the disc. The above track access control system includes a head moving unit for moving the movable head in the radial direction across the disc; an erasing beam moving unit, mounted on the movable head, for moving an impinging position of the erasing beam, on the movable head; a writing/reading beam moving unit, mounted on the movable head, for moving an impinging position of the writing beam or reading beam, on the movable head; a first track error detecting unit for detecting a deviation of the position of the erasing beam on the recording disc, from its optimum on-track position; a second track error detecting unit for detecting a deviation of the position of the writing beam or reading beam on the recording disc, from its optimum on-track position; a first driving control unit for outputting a first control quantity to control the operation of the head moving unit responding to the output of the first track error detecting unit so that the deviation detected in the first track error detecting unit is reduced; a second driving control unit for outputting a second control quantity to control the operation of the erasing beam moving unit responding to the output of the first track error detecting unit so that the deviation detected in the first track error detecting unit is reduced; and a third driving control unit for outputting a third control quantity to control the operation of the writing beam or reading beam moving unit responding to the output of the second track error detecting unit so that the deviation detected in the second track error detecting unit is reduced.

Alternatively, the above track access control system according to the second embodiment of the present invention further comprises an erasing beam displacement detecting unit instead of the above first track error detecting unit. The erasing beam displacement detecting unit detects a displacement of an outputting position of the erasing beam from a predetermined position on the head; and the above first driving control unit outputs the first control quantity to control the operation of the head moving unit responding to the output of the erasing beam displacement detecting unit, instead of the output of the first track error detecting unit, so that the displacement is reduced during a track servo operation. The second driving control unit outputs a second control quantity to control the operation of the erasing beam moving unit responding to the output of the first track error detecting means so that the deviation detected in the first track error detecting means is reduced.

According to a third aspect of to the present invention, there is provided a track access control system in a rotating disc storage device including a rotatable disc having a plurality of tracks which are formed in a direction of the rotation of the disc, and a movable head which is movable in a radial direction across the disc for writing or reading data on the disc. The movable head contains an erasing unit for erasing data which is written on a track of the disc by impinging an erasing beam, and a data writing/reading unit for writing or reading data on the track by impinging a writing or reading beam, where the erasing means is located in the position preceding to the data writing/reading means in the direction of the rotation of the disc. The above track access control system includes a head moving unit for moving the movable head in the radial direction across the disc; an erasing beam moving unit, mounted on the movable head, for moving an impinging position of the erasing beam, on the movable head; a writing/reading beam moving unit, mounted on the movable head, for moving an impinging position of the writing beam or reading beam, on the movable head; a first track error detecting unit for detecting a deviation of the position of the erasing beam on the recording disc, from its optimum on-track position during a track servo operation; a second track error detecting unit for detecting a deviation of the position of the writing beam or reading beam on the recording disc, from its optimum on-track position during the track servo operation; an erasing beam displacement detecting unit for detecting a displacement of an outputting position of the erasing beam from a predetermined position on the movable head during the track servo operation; a first driving control unit for outputting a first control quantity to control the operation of the head moving unit responding to the output of the second track error detecting unit so that the deviation detected in the second track error detecting unit is reduced during the track servo operation; a second driving control unit for outputting a second control quantity to control the operation of the writing beam or reading beam moving unit responding to the output of the second track error detecting unit so that the deviation detected in the second track error detecting unit is reduced during the track servo operation; a third driving control unit for outputting a third control quantity to control the operation of the erasing beam moving unit responding to the output of the first track error detecting unit so that the deviation detected in the first track error detecting unit is reduced during the track servo operation; a waveform memorizing unit for recording a waveform of the output of the erasing beam displacement detecting unit for a rotation cycle of the recording disc; a track jump control unit for outputting a fourth control quantity to control the head moving unit, the erasing beam moving unit, and the writing/reading beam moving unit, so that the position of the erasing beam and the writing beam or reading beam move to a requested track; and a jump control signal modifying unit for modifying the fourth control quantity by adding the recorded data of the waveform memorizing unit, corresponding to a current rotation angle of the recording disc thereto, during the track jump operation.

Alternatively, the above track access control system according to the third embodiment of the present invention further comprises a writing/reading beam displacement detecting unit for detecting a displacement of an outputting position of the writing beam or reading beam from a predetermined position on the movable head during the track servo operation; and the above first driving control unit outputs the first control quantity to control the operation of the head moving unit responding to the output of the writing/reading beam displacement detecting unit, instead of the output of the second track error detecting unit, so that the displacement detected in the writing/reading beam displacement detecting unit is reduced during the track servo operation.

BRIEF DESCRIPTION OF THE DRAWINGS

In the drawings:

FIGS. 13A, 13B, 13C, 13D, 13E, 13F, 13G and 13H show an example of the timing relationship between the above signals in the waveform storage circuit 7;

FIGS. 14A, 14B and 14C show an example of the data recording operation of the waveform storage circuit 7 when a signal TES, in the sinusoidal waveform appears in the output of the phase compensation circuit 33b;

FIGS. 15A and 15B show a control process of a track jump operation in the MPU 5 in accordance with the first embodiment of the present invention;

FIGS. 23A and 23B show a construction for the track servo control, in accordance with the fourth embodiment of the present invention;

FIGS. 24A and 24B show a construction for the track servo control, in accordance with the fifth embodiment of the present invention;

FIGS. 26, 27A, 27B and 28 show a construction for the track access control, in accordance with the sixth embodiment of the present invention;

DESCRIPTION OF THE PREFERRED EMBODIMENTS

Basic Mechanism of Optical Head

Figure 1:
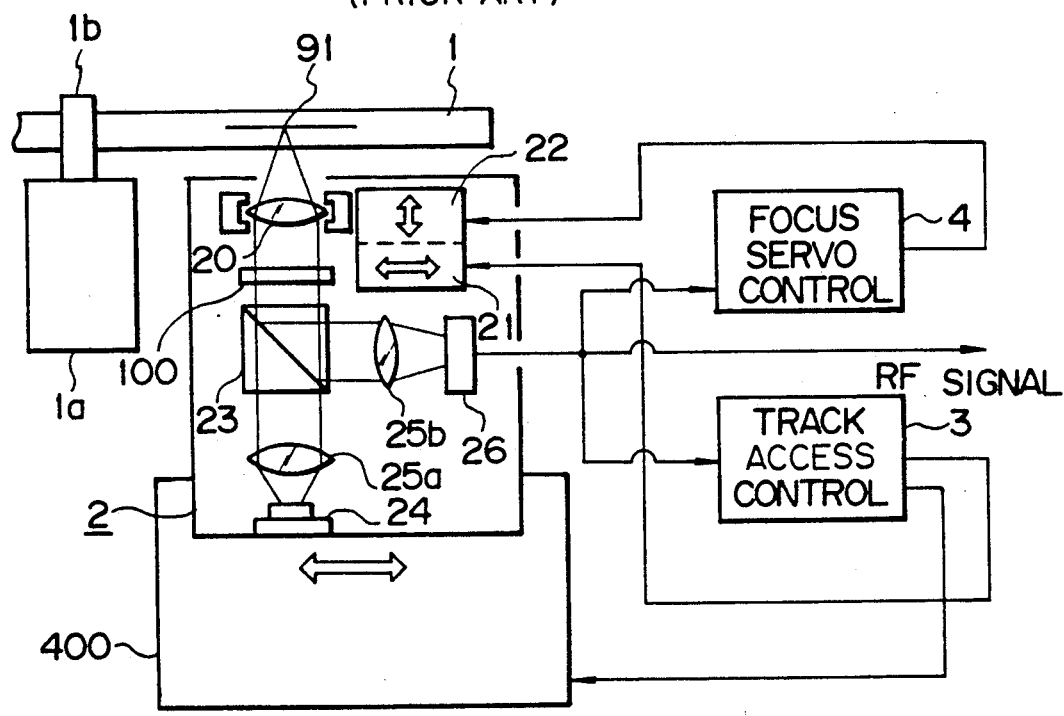
FIG. 1 shows an outline of the construction of a magneto-optical disc device.

FIG. 1 shows an outline of the construction of a track access system in a magneto-optical disc device.

In FIG. 1, reference numeral 1 denotes a magneto-optical disc, 1a denotes a rotation mechanism containing a spindle motor, 1b denotes a rotating axle, 2 denotes an optical head, 3 denotes a track access control circuit, and 4 denotes a focus servo control portion, 20 denotes an object lens, 21 denotes a track actuator, 22 denotes a focus actuator, 23 denotes a polarized beam splitter, 24 denotes a semiconductor laser device, 25a and 25b each denote a lens, 26 denotes a quartering light sensing device, 100 denotes a quarter wavelength plate, and 400 denotes a head actuating device.

The magneto-optical disc 1 rotates driven by the motor 1a through the rotating axle 1b. The optical head 2 is moved in the radial direction by the head actuating device 400 which is driven by a voice coil motor (not shown), and is then positioned to an objective track of the magneto-optical disc 1.

In the optical head 2, a light emitted from the semiconductor device 24 is lead and focused through the lens 25a, the polarized beam splitter 23, the quarter wavelength plate 100, and the object lens 20, and is then impinged on to the track surface of the magneto-optical disc 1. A light reflected by the track surface is lead through the object lens 20, the quarter wavelength plate 100, the polarized beam splitter 23, and the lens 25b, to the quartering light sensing device 26, and thus, is detected at the quartering light sensing device 26.

Responding to the above detected signal, the quartering light sensing device 26 generates an electric reflection signal, the amplitude of which corresponds to the intensity of the above reflected and detected light.

Generally, tracks are formed spirally or concentrically on magneto-optical discs at the pitch of at most a few micrometers, and the extension of a focused beam spot area on the track surface is controlled to be less than one micrometer. However, as mentioned before, an eccentricity of an amount comparable with the above pitch or more may exist in the arrangement of the above tracks on magneto-optical discs. In addition, some waviness, which causes an off-focus at the track surface of magneto-optical discs, may exist in magneto-optical discs.

In spite of the above situation, the optical beam is required to be focused on the track surface, and the focused beam spot is required to follow the above narrow track. To fulfill the above requirements, the focus actuator (focus coil) 22, the focus servo control portion 4, the track actuator (track coil) 21, and the track access control circuit 3 are provided.

The focus actuator 22 moves the object lens 20 in the optical head 2 in the direction perpendicular to the surface of the magneto-optical disc 1 to adjust the focus position of the impinging optical beam under the control of the focus servo control portion 4, and the focus servo control portion 4 receives the output of the quartering light sensing device 26, which consists of a plurality of receiving light signals, and generates a focus error signal (FES) to drive the focus actuator 22 in a feedback mode so that the optimum focus condition at the track surface of the magneto-optical disc 1 is maintained.

The track actuator 21 moves the object lens 20 in the optical head 2 in the radial direction of the magneto-optical disc 1 to adjust the position of the impinging optical beam in the radial direction under the control of the track access control circuit 3, and the track access control circuit 3 receives the output of the quartering light sensing device 26, which consists of a plurality of received light signals, and generates a track error signal (TES) to drive the track actuator 21 in a feedback mode so that the position of the impinging optical beam is maintained at the center of the track width of the magneto-optical disc 1.

The principle of the track servo control is explained with reference to FIGS. 2A to 4.

Figure 2A:
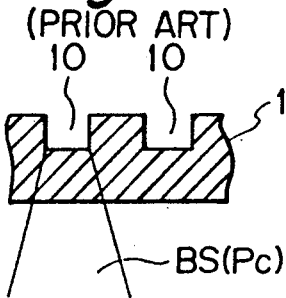
FIG. 2A shows a cross-section of a portion of a magneto-optical disc.

FIG. 2A shows a cross-section of a portion of a magneto-optical disc. In FIG. 2A, reference 10 denotes a track, and "BS" denotes a beam spot. Data is written in the groove portion, and a bank is located between each pair of adjacent tracks (grooves).

Figure 2B:
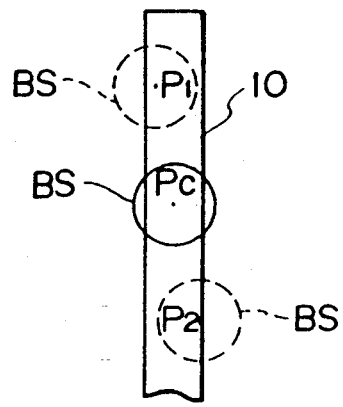
FIG. 2B shows examples of the locations of beam spots on the surface of the magneto-optical disc.

FIG. 2B shows examples of the locations of beam spots on the surface of the magneto-optical disc. In FIG. 2B, reference "BS" denotes a beam spot "Pc" denotes an on-track condition wherein a spot area of an impinging light beam is at the center of the track width of the magneto-optical disc 1, "P1" denotes an off-track condition wherein a spot area of an impinging light beam is in one side of the center of the track width of the magneto-optical disc 1, and "P2" denotes an off-track condition wherein a spot area of an impinging light beam is in the other side of the center of the track width of the magneto-optical disc 1.

Figure 3A:
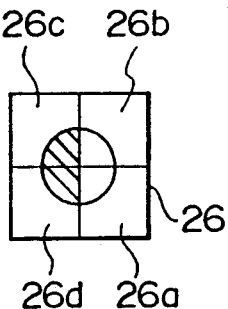
FIGS. 3A, 3B, and 3C show distributions of intensity of a received light on a light input surface of the light sensing device.
Figure 3B:
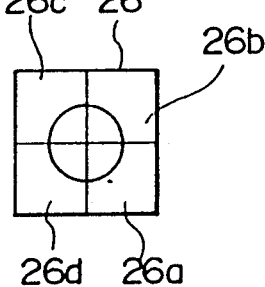
Figure 3C:
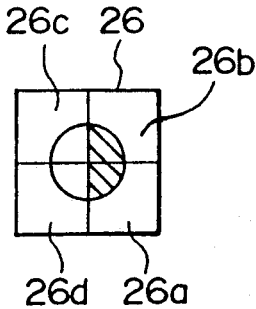

FIGS. 3A, 3B, and 3C show distributions of intensity of a received light on a light input surface of the quartering light sensing device 26. FIG. 3A shows the distribution in the above off-track condition "P1", FIG. 3B shows the distribution in the above on-track condition "Pc", and FIG. 3C shows the distribution in the above off-track condition "P2".

The aforementioned track error signal (TES) is defined as $$TES = (a+d) - (c+b),$$

where "TES" denotes an intensity of the track error signal (TES), "a" denotes an intensity of the light received by the light sensing detector "a", "b" denotes an intensity of the light received by the light sensing detector "b", "c" denotes an intensity of the light received by the light sensing detector "c", and "d" denotes an intensity of the light received by the light sensing detector "d", respectively, and the track error signal (TES) is obtained in the track access control circuit 3.

Figure 4:
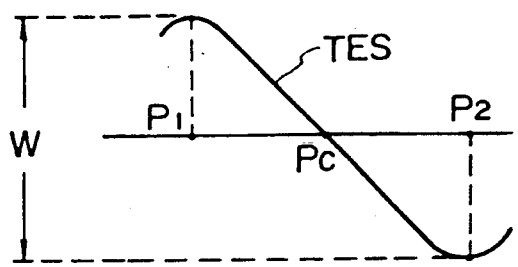
FIG. 4 shows a variation of the amplitude of the above track error signal (TES) as a function of the position of the beam, spot area of the impinging light beam regarding the center of the track width.

FIG. 4 shows a variation of the amplitude of the above track error signal (TES) as a function of the position of the beam spot area of the impinging light beam regarding the center of the track width. Since the value of the track error signal (TES) in the above on-track condition "Pc" is zero, the track access control circuit 3 controls the track actuator 21 according to the above obtained value of the track error signal (TES) so as to maintain the TES value near zero, and thereby the position of the spot area of the impinging light beam is maintained at the center of the track width in the magneto-optical disc 1, even when an eccentricity exists in the magneto-optical disc 1.

Figure 5:
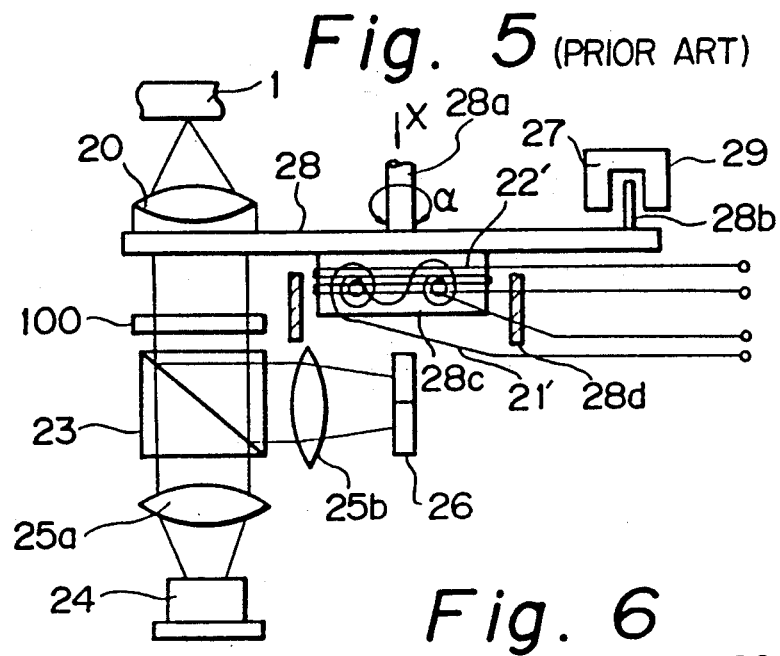
FIG. 5 shows a construction of a portion of the optical head including the focus actuator and track actuator magneto-optical disc.

FIG. 5 shows a construction of a portion of the optical head including the focus actuator and track actuator magneto-optical disc.

In FIG. 5, reference numeral 22' denotes a focus actuator coil, 21' denotes a track actuator coil, 28 denotes a body of an actuator, 27 denotes a light emitting device, 29 denotes a light sensing device, 28a denotes a rotation axle of the actuator, 28b denotes a slit, 28c denotes a coil portion, 28d denotes a fixed magnet, and the other reference numerals which are same as FIG. 1 each denote the same component as FIG. 1.

The body 28 of the actuator can rotate around the axle 28a which is fixed to the optical head 2 of FIG. 1. The aforementioned object lens 20 and an accompanying optical system comprised of the polarized beam splitter 23, the semi-conductor laser device 24, the lenses 25a and 25b, the quartering light sensing device 26, and the quarter wavelength plate 100, are fixed to one end of the body 28, and the slit 28b is fixed to the other end of the body 28. The coil portion 28c is fixed to the center of the body 28.

The fixed magnet 28d is arranged around the coil portion 28c. The track actuator coil 21' and the focus actuator coil 22' are fixed to the coil portion 28c so that the coil portion receives an electromagnetic force in the direction of the axle 28a (which is denoted by "X"), which force is generated by the magnetic field by the fixed magnet 28d and the current through the focus actuator coil 22', and receives an electromagnetic force in the direction of the rotation of the body 28 (which is denoted by "α"), which force is generated by the magnetic field by the fixed magnet 28d and the current through the track actuator coil 22'.

Figure 6:
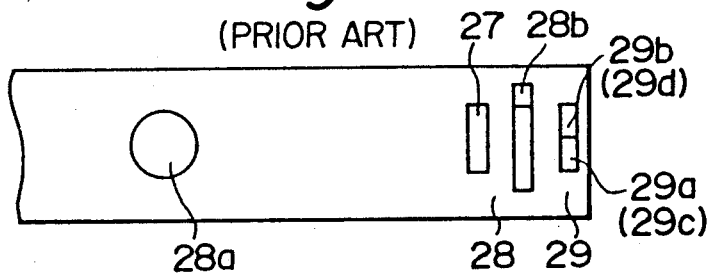
FIG. 6 shows a relative position of the slit 28b which is fixed to the body 28, the light emitting device 27, and the light sensing device 29.

FIG. 6 shows a relative position of the slit 28b which is fixed to the body 28, the light emitting device 27, and the light sensing device 29. The light emitting device 27 and the light sensing device 29 are fixed to the optical head 2, and the slit 28b is located between the light emitting device 27 and the light sensing device 29, and moves across the path of the light emitted from the light emitting device 27 with the rotation of the body 28. The light sensing device 29 is a quartering light sensing device which is comprised of four quadrant portions 29a, 29b, 29c, and 29d.

Figure 7A:
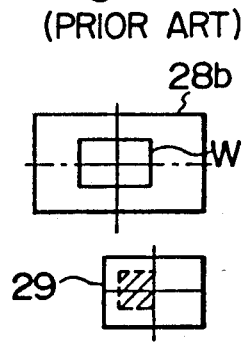
FIGS. 7A, 7B, and 7C show examples of the relative locations of the slit 28b and the light sensing device 29, and the corresponding distributions of received light at the four quadrants of the light sensing device 29.
Figure 7B:
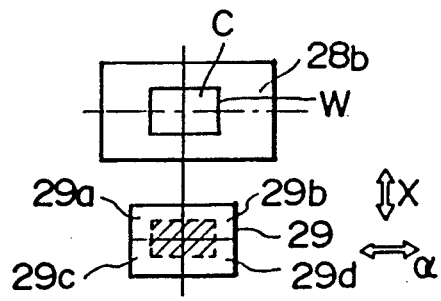
Figure 7C:
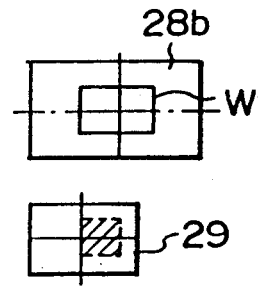

FIGS. 7A, 7B, and 7C show examples of the relative locations of the slit 28b and the light sensing device 29, and the corresponding distributions of received light at the four quadrants of the light sensing device 29. The slit 28b has a window which is denoted by "W", the light emitted from the light emitting device 27 passes through the window W to the light sensing device 29. FIG. 7A shows an off-center position, FIG. 7B shows a center position, and FIG. 7C shows another off-center position. As shown in FIGS. 7A, 7B, and 7C, the distributions of received light at the light sensing device 29 vary with the displacement of the slit 28b from the center position in both the direction X of the axle 28a and the direction α of the rotation of the body 28.

The light sensing device 29 generates a track traversing direction lens position signal LPOS and a focus direction lens position signal FPS responding to the above distribution of the received light. The track traversing direction lens position signal LPOS and the focus direction lens position signal FPS are respectively defined as $$LPOS = (A+C) - (B+D), \text{ and}$$

$$FPS = (A+B) - (C+D).$$

where "LPOS" denotes an intensity of the track traversing direction lens position signal LPOS and "FPS" denotes an intensity of the focus direction lens position signal FPS, "A" denotes an intensity of the light received by the quadrant portion 29a, "B" denotes an intensity of the light received by the quadrant portion 29b, "C" denotes an intensity of the light received by the quadrant portion 29c, and "D" denotes an intensity of the light received by the quadrant portion 29d, respectively.

Figure 8:
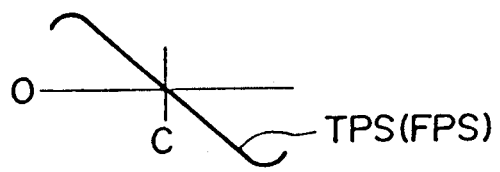
FIG. 8 shows a variation of the amplitude of the track traversing direction lens position signal LPOS (or the focus direction lens position signal FPS) as a function of the position of the body 28 regarding the center position.

FIG. 8 shows a variation of the amplitude of the above track traversing direction lens position signal LPOS (or the focus direction lens position signal FPS) as a function of the position of the body 28 regarding the center position. As shown in FIG. 8, the amplitude of the above track traversing direction lens position signal LPOS varies from zero with the off-center of the distribution of the received light in the direction α, and the amplitude of the above focus direction lens position signal FPS varies from zero with the off-center of the distribution of the received light in the direction X.

Figure 9:
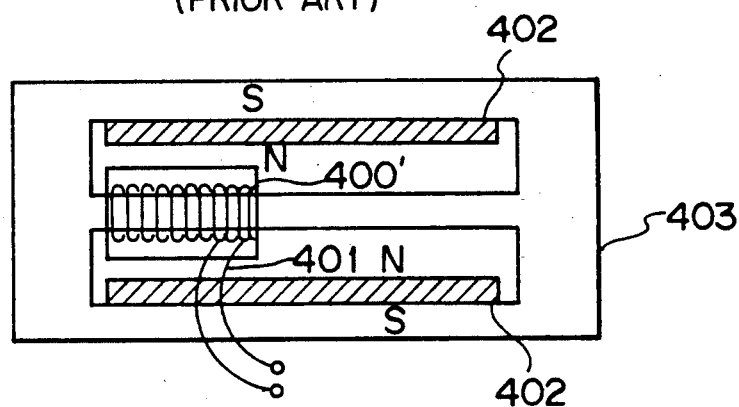
FIG. 9 shows the aforementioned voice coil motor 400 which moves the optical head 2.

FIG. 9 shows the aforementioned voice coil motor 400 which moves the optical head 2.

In FIG. 9, 400' denotes a coil portion, 401 denotes a coil which is fixed to the coil portion 400', 402 denotes a magnet, and 403 denotes an iron core.

The iron core 403 has a hollow and an iron rail portion which passes across the hollow and passes through above coil 401, as shown in FIG. 9. The magnet is fixed to the iron core as shown in FIG. 9, so that the coil portion 400' moves along the iron rail by the electromagnetic force generated by the current in the coil 402 and the magnetic field which is caused by the magnet 402.

Figure 10:
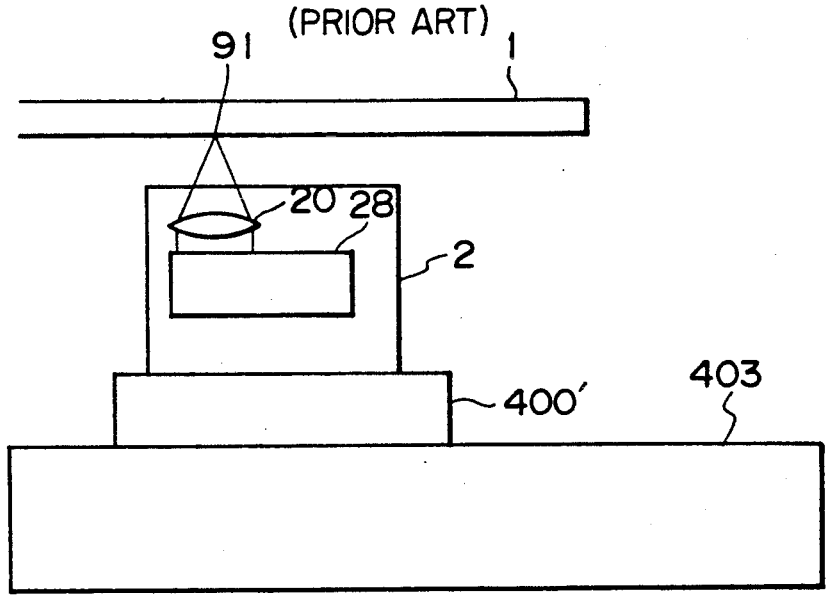
FIG. 10 shows an overall arrangement of the above coil portion 400', the iron core 403, and the optical head 2.

FIG. 10 shows an overall arrangement of the above coil portion 400', the iron core 403, and the optical head 2. As shown in FIG. 10, the optical head 2 is fixed to the coil portion 400', and therefore moves with the coil portion 400'. The above iron rail portion is arranged in the direction of the radius of the magneto-optical disc.

Track Access Control Circuit in the First Embodiment

Figure 11A:
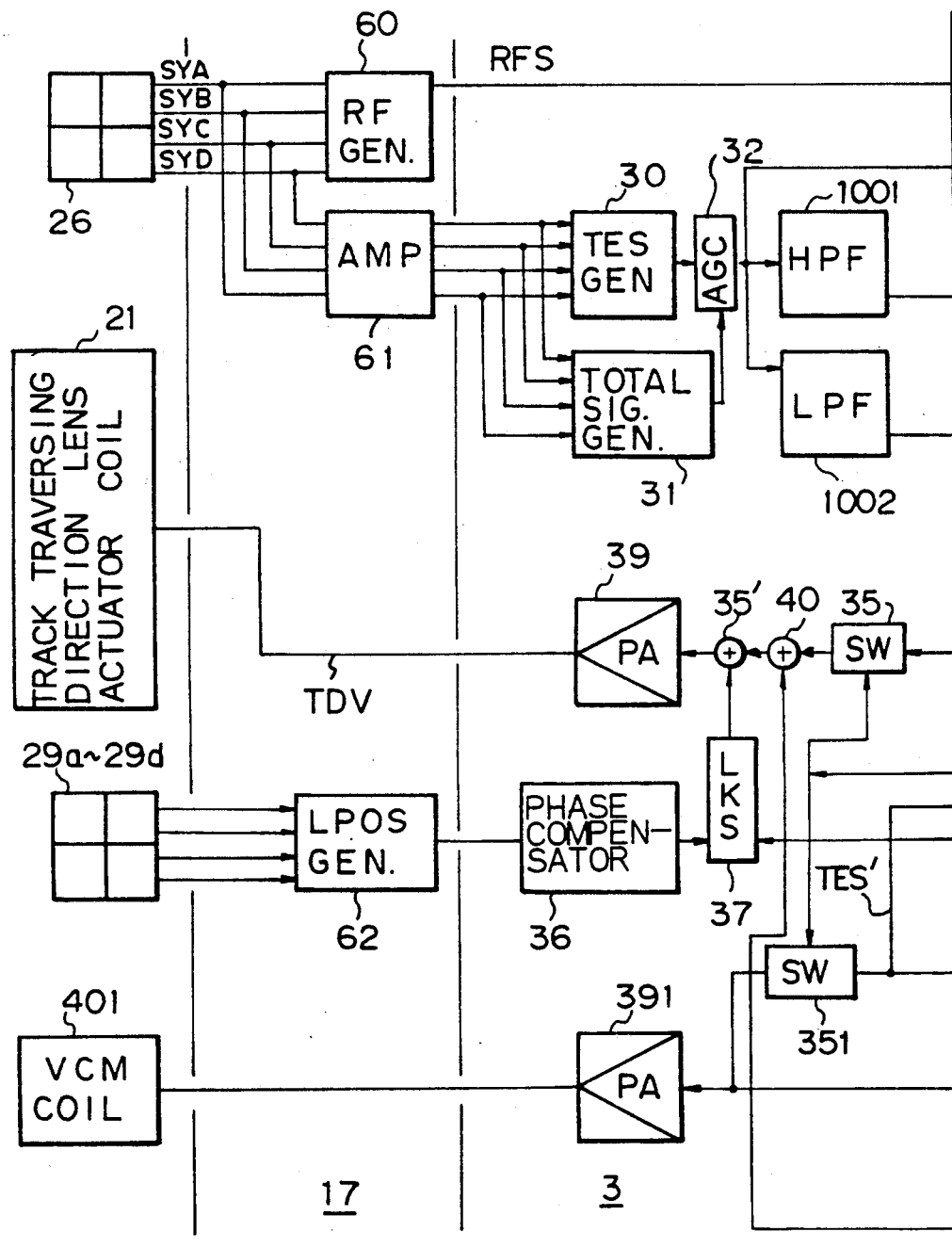
FIGS. 11A and 11B show a construction of the track access control circuit 3 in accordance with the first embodiment of the present invention.
Figure 11B:
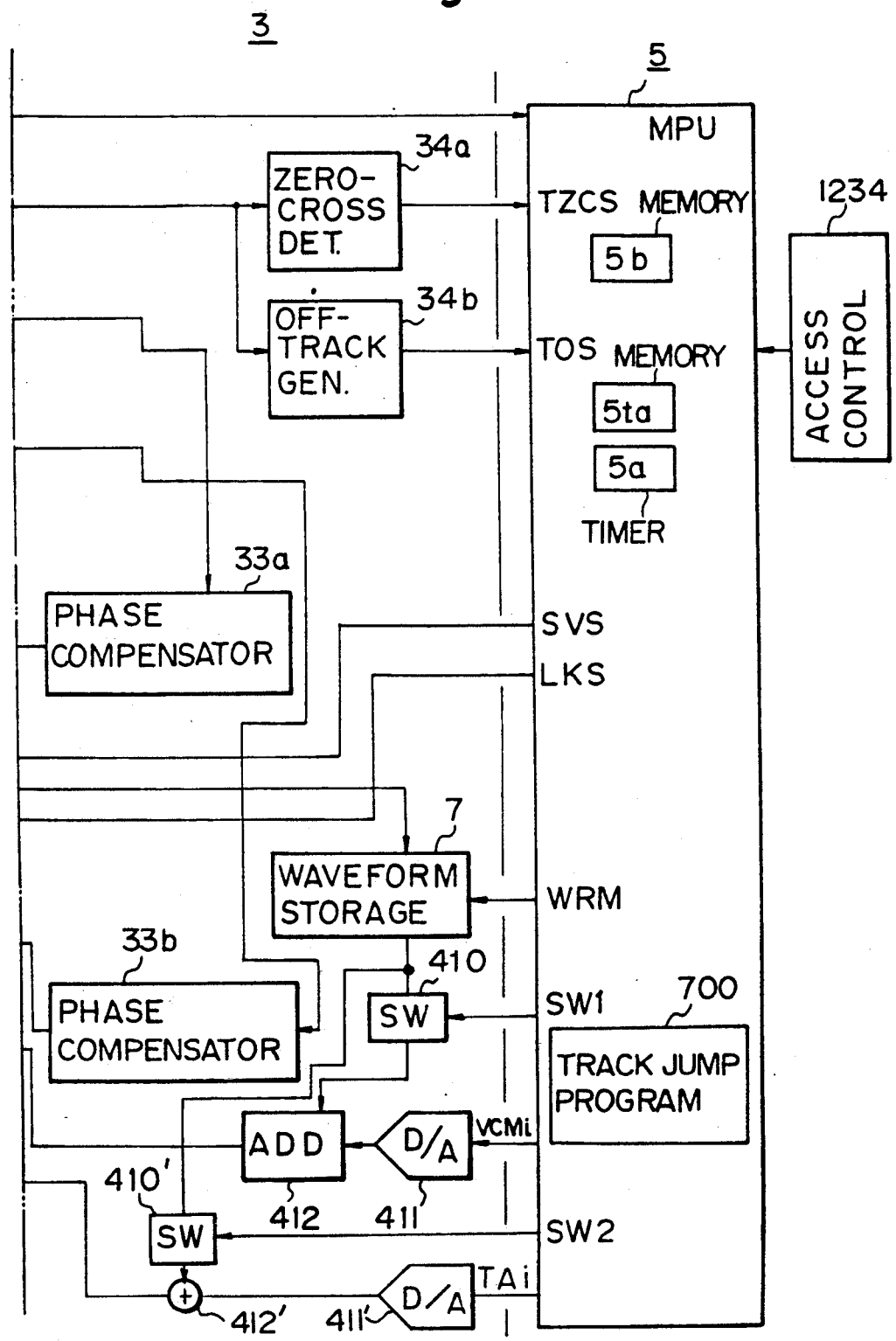

FIGS. 11A and 11B show a construction for the track servo control in the first embodiment of the present invention.

In FIGS. 11A and 11B, reference numeral 3 denotes the track access control circuit, 5 denotes a control portion, 17 denotes a circuit portion provided in the optical head 2, and 1234 denotes an access control portion. Reference numeral 26 denotes the quartering light sensing device shown in FIG. 1, 21' denotes the track traversing direction lens actuator shown in FIGS. 7A to 7C, 29a to 29d denote the light sensing device shown in FIG. 5, and 401 denotes the coil in the voice coil motor. In the circuit portion 17, reference numeral 60 denotes an RF generation circuit, 61 denotes an amplifier, and 62 denotes an LPOS signal generation circuit. In the track access control circuit 3, reference numeral 7 denotes a waveform storage circuit, 30 denotes a TES signal generation circuit, 31 denotes a total signal generation circuit, 32 denotes an automatic gain control (AGC) circuit, 33a and 33b each denote a phase compensation circuit, 34a denotes a zero-cross point detecting circuit, 34b denotes an off-track detecting circuit, 35 and 351 each denote a servo switch, 35', 40, 412, and 412' each denote an adding circuit, 36 denotes a phase compensation circuit, 37 denotes a lock-on switch, 39 and 391 each denote a power amplifier, 410 and 410' each denote a switch, 411 and 411' each denote a digital to analog converter, 1001 denotes a high pass filter, and 1002 denotes a low pass filter. In the control portion 5, 5a denotes a timer, 5b denotes a memory, and 700 denotes a track jump program.

The access control portion 1234 is, for example, a host processor, and gives a command to write or read data in the magneto-optical disc device. The control portion is comprised of a microprocessor unit (MPU), receives the command to write or read data in the magneto-optical disc device from the access control portion 1234, and controls the magneto-optical disc device in accordance with the command and a control program including the track jump program 700.

In the circuit portion 17 in the optical head 2, the RF signal generation circuit 60 generates RF signals from the output of the quartering light sensing device 26, and extracts RF components which contain data information recorded on the track. In the track jump operation, the RF signals are used for reading track addresses (ID Numbers of tracks) which are pre-formatted on the tracks. The amplifier 61 amplifies the four output signals from the quartering light sensing device 26. The LPOS signal generation circuit 62 generates the aforementioned track traversing direction lens position signal LPOS responding to the outputs of the quartering light sensing device 29.

In the track access control circuit 3, the TES signal generation circuit 30 generates the aforementioned TES signal based on the outputs of the amplifier 61. The total signal generation circuit 31 obtains a summation of the four output signals of the amplifier 61 to generate a total signal DSC which corresponds to a total intensity of the reflected light. The total signal DSC and the TES signal are supplied to the automatic gain control (AGC) circuit 32. The automatic gain control (AGC) circuit 32 divides the TES signal by the total signal DSC to compensate variation factors in the TES signal due to the intensity of the impinging beam and the reflection rate at the surface of the magneto-optical disc. The output of the automatic gain control (AGC) circuit 32 is supplied to the high pass filter circuit 1001, the low pass filter circuit, the zero-cross detecting circuit 34a, and the off-track generation circuit 34b. The high pass filter circuit 1001 outputs a high frequency component of the above gain-controlled TES signal, and the low pass filter circuit 1002 outputs a low frequency component of the above gain controlled TES signal.

The output of the high pass filter circuit 1001 is supplied to the phase compensation circuit 33a, and the output of the low pass filter circuit 1002 is supplied to the phase compensation circuit 33b. The phase compensation circuit 33a advances the phase of high frequency components of the gain-controlled track error signal TES by adding a differential of the high frequency components of the gain-controlled track error signal TES and a component proportional to the high frequency components of the gain-controlled track error signal TES, and the phase compensation circuit 33b advances the phase of low frequency components of the gain-controlled track error signal TES by adding a differential of the low frequency components of the gain-controlled track error signal TES and a component proportional to the low frequency components of the gain-controlled track error signal TES.

The servo switch 35 is made open responding to an inactive servo-on signal which is supplied from the MPU 5 to open a track servo loop, or is made closed responding to an active servo-on signal from the MPU 5 to close a track servo loop.

When the track servo loop is closed, the output of the phase compensation circuit 33a is supplied to the power amplifier 39 through the servo switch 35 to drive the track lens actuator 21, and the output TES' of the phase compensation circuit 33b is supplied to the power amplifier 391 through the servo switch 351 to drive the voice coil motor 400. Thus, in the track servo operation, a double servo operation including the servo operation by the high frequency range of the track error signal TES using the track traversing direction lens actuator 21 and the servo operation by the low frequency range of the track error signal TES using the voice coil motor 400, is carried out.

In the track servo operation, the output of the phase compensation circuit 33b is a control signal to control the voice coil motor 400 to follow a track in a low frequency region, i.e., to roughly follow the track responding to the low-frequency variation of the force necessary to follow the position of the track in the radial direction of the magneto-optical disc, and the output of the phase compensation circuit 33a is a control signal to control the track traversing direction lens actuator 21 to follow the track in a high frequency region, i.e., to finely follow the optimum position on the track responding to the high-frequency (fine) variation of the force necessary to follow the position of the track in the radial direction of the magneto-optical disc.

The above low-frequency variation of the force necessary to follow the position of the track in the radial direction of the magneto-optical disc, is caused mainly by the eccentricity of the disc, an inclination of a direction of movement of the optical head 2, a tension caused by cables which are connected to the optical head, a friction force, and the like. The driving current i of the voice coil motor 400 generates a force $F=iLB$, where L denotes an effective length of the coil, and B is a strength of the magnetic field generated by the magnet 402. The force F is expressed as $F=Ma$ where M denotes a mass of a movable portion of the optical head 2, and a denotes an acceleration of the optical head 2. That is, the acceleration of the optical head 2 is expressed as $a=iLB/M$, which is proportional to the driving current i. Among the above causes of the low-frequency variation of the force necessary to follow the position of the track in the radial direction of the magneto-optical disc, the force caused by the eccentricity is estimated nearly equal to g (acceleration of gravitation) when the rotation speed is 3600 RPM and the eccentricity is 100 $\mu$mp-p, and the forces for the other causes are much less than g. Namely, the output of the phase compensation circuit 33b during the track servo operation almost indicates the degree of a deviation from a constant radius, and an amount of the control signal necessary to follow the deviated track due to the eccentricity.

The zero-cross detecting circuit 34a detects a zero-cross timing when the TES signal crosses zero level, and then outputs a track zero-cross signal TZSC to the MPU 5 responding to the detection. The off-track detecting circuit 34b detects an off-track state wherein a level of the track error signal TES exceeds a predetermined range in either of plus and minus directions, and outputs an off-track signal TOS to the MPU 5 responding to the detection.

The phase compensation circuit 36 generates a return signal RPS to return the track traversing direction lens actuator 21' to the center position by supplying the signal to the power amplifier 39. The lock-on switch 37 is made open responding to an inactive lock-on signal which is supplied from the MPU 5 to open a path for supplying the return signal RPS to the power amplifier 39, or is made closed responding to an active lock-on signal from the MPU 5 to close the path. The power amplifier 39 amplifies the output of the phase compensation circuit 36 to supply a track driving current TDV to the track traversing direction lens actuator 21'. The lock-on signal is made active by the MPU 5 to fix the position of the body 28 (FIG. 5) to its center position, i.e., to electrically lock the optical head 2. The function of the lock-on of the optical head 2 is used, for example, to fix the position of the body 28 (FIG. 5) to its center position during a track seek operation, or to return the position of the body 28 (FIG. 5) to its center position when the off-track state is detected.

The waveform storage circuit 7 records the output TES' of the phase compensation circuit 33b and memorizes the waveform of the control signal of the voice coil motor 400 when so controlled by the MPU 5.

The MPU 5 outputs a velocity control signal VCMi to move the optical head 2 to the track which is requested by the access control portion 1234, based on the calculation in accordance with the track jump program when a track jump command is received from the access control portion 1234. The velocity control signal VCMi is converted to an analog signal in the digital to analog converter 411, and is supplied to the power amplifier 391 through the adding circuit 412 to drive the voice coil motor 401. The adding circuit 412 adds the output of the digital to analog converter 411 and the output of the switch 410.

The switch 410 is made closed under the control of the MPU 5 to supply the memorized control signal of the voice coil motor 400 to the adding circuit 412, or is made open under the control of the MPU 5. When the switch 410 is made closed, the memorized control signal of the voice coil motor 400 is added to the output of the digital to analog converter 411, and thus, the driving current to drive the voice coil motor 400 is modified corresponding to the eccentricity of the track on the magneto-optical disc.

When the number of tracks which is to be jumped is less than a predetermined number, i.e., when the number is a number which can be jumped by the operation of the track traversing direction lens actuator 21', the MPU 5 outputs a velocity control signal TAi to move the optical head 2 to the track which is requested by the access control portion 1234, based on the calculation in accordance with the track jump program when a track jump command is received from the access control portion 1234. The velocity control signal TAi is converted to an analog signal in the digital to analog converter 411', and is supplied to the power amplifier 39 through the adding circuits 40 and 35' to drive the track traversing direction lens actuator 21'. The adding circuit 412' adds the output of the digital to analog converter 411' and the output of the switch 410'.

The switch 410' is made closed under the control of the MPU 5 to supply the memorized control signal of the voice coil motor 400 to the adding circuit 412', or is made open under the control of the MPU 5. When the switch 410 is made closed, the memorized control signal of the voice coil motor 400 is added to the output of the digital to analog converter 411', and thus, the driving current to drive the track traversing direction lens actuator 21' is modified corresponding to the eccentricity of the track on the magneto-optical disc.

Waveform Storage Circuit

Figure 12:
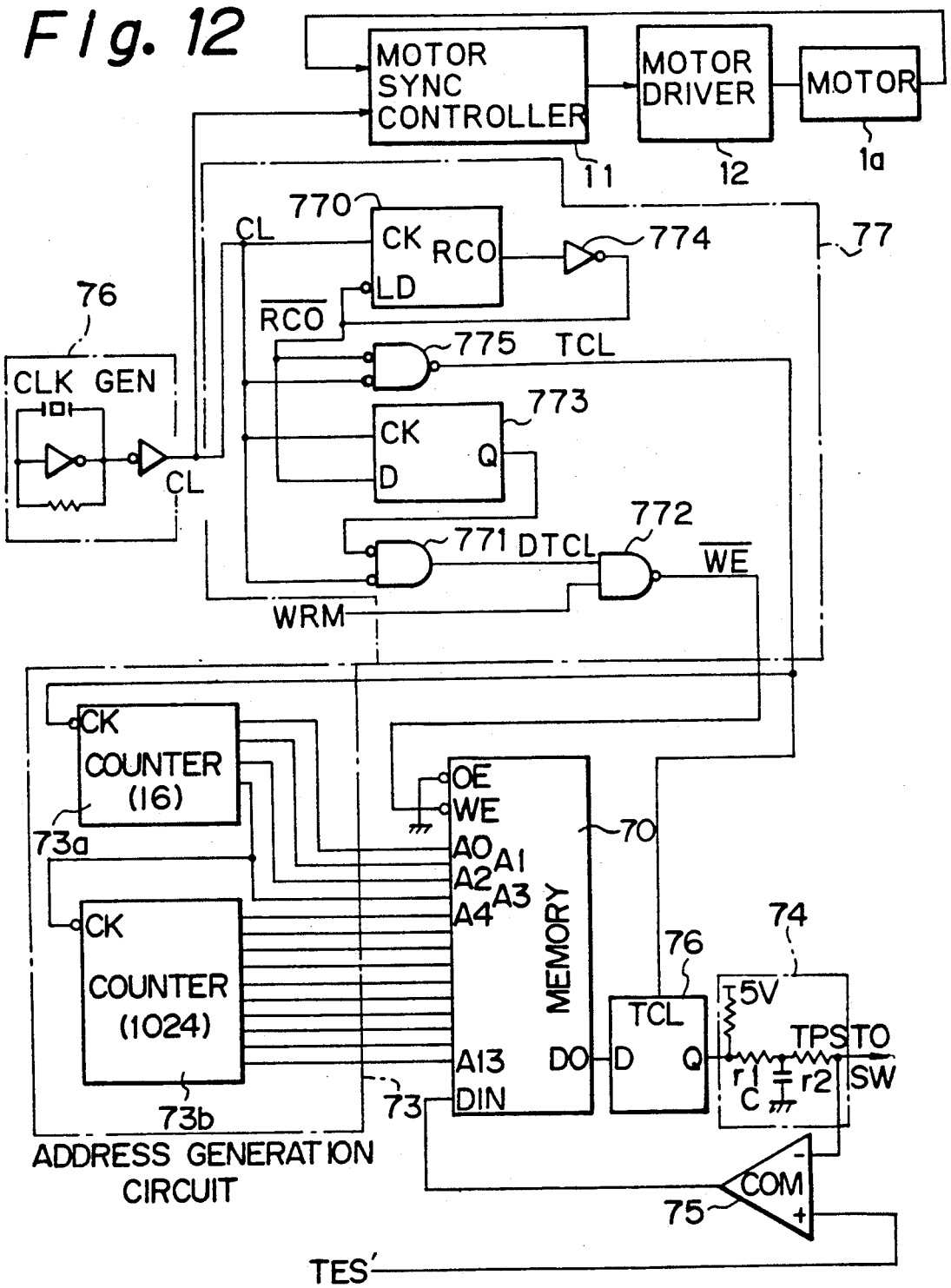
FIG. 12 shows a construction of the waveform storage circuit 7 in the embodiment of the present invention.

FIG. 12 shows a construction of the waveform storage circuit 7 in the embodiment of the present invention.

In FIG. 12, reference numeral 11 denotes a motor synchronization control circuit, 12 denotes a motor driving circuit, 1a denotes the spindle motor for rotating the magneto-optical disc, 70 denotes a memory, 73 denotes an address generation circuit, 74 denotes a filter circuit, 75 denotes a comparator, 76 denotes a clock generation circuit, 77 denotes a memory control circuit, and 78 denotes a D-type flip-flop circuit.

The clock generation circuit 76 comprises a quartz oscillator generating a clock signal CL. The memory control circuit 77 generates an address count signal ACL from the above clock CLK, an output enable signal OE and a write enable signal WE in accordance with a mode signal WRM which is supplied from the MPU 5.

The motor synchronization control circuit 11 receives the above clock signal CL from the clock generation circuit 76 and a position signal from the spindle motor 1a, and controls the spindle motor 1a through the motor driving circuit 12 to rotate with a constant speed synchronizing with the clock CL.

The memory control circuit 77 comprises a synchronous counter 770, an AND circuit 771, NAND circuits 772 and 775, an inverter 774, and a D-type flip-flop circuit 773. The counter 770 inputs the clock signal CL as shown in FIG. 13A, and generates a ripple carry output RCO having a frequency equal to one-fifth of the frequency of the clock signal CL, as shown in FIG. 13B. The ripple carry output RCO is logically inverted through the inverter 774, and the inverted ripple carry output $\overline{RCO}$ is applied to the negative logic load input LD of the counter 770, and is applied to one negative logic input terminal of the NAND circuit 775 and the D-input terminal of the flip-flop circuit 773. The above clock signal CL is applied to the other negative logic input terminal of the NAND circuit 775 and the edge triggered input terminal of the flip-flop circuit 773. The output of the NAND circuit 775 is obtained as a timing clock signal TCL as shown in FIG. 13C. The timing clock signal TCL is supplied to the address generation circuit 73 and the D-type flip-flop circuit 78. The AND circuit 771 receives the Q output of the flip-flop circuit 773 and the above clock CL at its negative logic input terminals, and its output DTCL is applied to one input terminal of the NAND circuit 772. The NAND circuit 772 receives a mode signal WRM from the MPU 5 at the other input terminal, and the output of the NAND circuit 772 is obtained as a write enable signal $\overline{WE}$. The write enable signal $\overline{WE}$ is applied to the memory circuit 70. When the mode signal WRM is "1" as shown in FIG. 13E, the write enable signal $\overline{WE}$ as shown in FIG. 13F is applied to the memory circuit 70.

The address generation circuit 73 comprises two counters 73a and 73b respectively generating higher order bits and lower order bits of an address signal to be applied to the memory circuit 70. The counter 73a increments its count (the address signal) at the timing of each trailing edge of the above timing clock TCL. The address which is output from the address generation circuit 73 changes cyclically corresponding to one rotation of the spindle motor 1a.

The filter circuit 74 comprises resistors r1 and r2 in both the input and output sides, and a capacitor C, and constitutes an integrating filter circuit. The negative logic output enable control terminal OE is constantly connected to the earth level. The data output of the memory circuit 70 is latched in the flip-flop circuit 78 at each timing of the timing clock TCL, and the Q output DQ of the flip-flop circuit 78 is integrated through the filter circuit 74, i.e., high frequency components of successive outputs of the memory circuit 70 is eliminated through the filter circuit 74. The output of the filter circuit 74 is applied to one input terminal of the comparator 75, and the aforementioned output TES' of the phase compensation circuit 33b is applied to the other input terminal of the comparator 75. An example of the timing relationship between the above signals in the waveform storage circuit 7 is shown in FIGS. 13A to 13H.

Figure 14A:
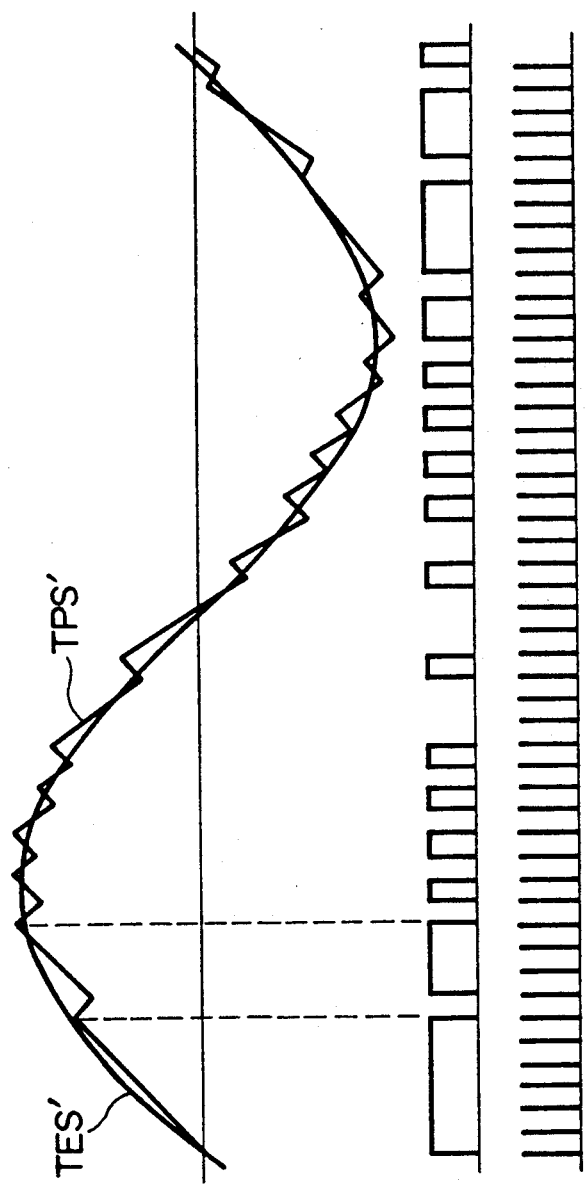

FIGS. 14A to 14C show an example of the data recording operation of the waveform storage circuit 7 when a signal TES' in the sinusoidal waveform appears in the output of the phase compensation circuit 33b.

In the initial condition, the content of the memory circuit 70 is all zero, and therefore, the output DO of the memory circuit 70 is zero, and the output TPS of the filter circuit 74 is zero. The comparator 75 outputs "1" when its input TES' from the phase compensation circuit 33b is larger than the other input TPS, or outputs "0" when its input TES' from the phase compensation circuit 33b is not larger than the other input TPS. The output of the comparator 75 is applied to the data input terminal DIN of the memory circuit 70. The memory circuit 70 inputs the applied data in an address which is supplied from the address generation circuit 73, when an active write enable signal WE is applied thereto during a data recording cycle. When data which is written in the memory circuit 70 appears, at the same time, in the output DO of the memory circuit 70, and therefore, when data "1" is written in the memory circuit 70, the output TPS of the filter circuit 74 is increased, or when data "0" is written in the memory circuit 70, the output TPS of the filter circuit 74 is decreased. Thus, as shown in FIGS. 14A to 14C, the output level TPS follows the level of the output TES' of the phase compensation circuit 33b, and the waveform of the output TES' of the phase compensation circuit 33b corresponding to one rotation of the magneto-optical disc 1 is recorded in the memory circuit 70 in the manner of the delta modulation.

Any shape of wave other than a sinusoidal shape can be recorded by the above recording operation. While the MPU 5 outputs the mode signal WRM of "1" for one rotation of the magneto-optical disc, the above data recording is automatically carried out without any further load on the MPU 5. The one rotation of the magneto-optical disc can be detected by a home position signal which indicates one rotation of the magneto-optical disc.

Although in FIGS. 14A to 14C, the coarse sampling cycle is shown, 16,000 samples per one rotation of the spindle motor 1a are taken in practice. Since, as mentioned before, the output of the phase compensation circuit 33b during the track servo operation almost indicates the degree of a deviation from a constant radius, and an amount of the control signal necessary to follow the deformed track due to the eccentricity, the amount of the control signal necessary to follow the deformed track due to the eccentricity, is recorded by the waveform storage circuit 7.

When reading the waveform which is memorized in the memory circuit 70, the MPU 5 outputs the mode signal WRM "0", the write enable signal $\overline{WE}$ which is applied to the memory circuit 70 is inactive. Since the memory circuit 70 is constantly enabled to output data, responding to the address which is output from the address generation circuit 73 and changes cyclically synchronizing with the rotation of the magneto-optical disc 1, the same data as the input data DIN shown in FIG. 14B is output from the memory circuit 70, and therefore the output having a similar shape of the signal TPS shown in FIG. 14A is output from the filter circuit 74.

Operation of the First Embodiment

FIGS. 15A and 15B show a control process of a track jump operation in the MPU 5 in the first embodiment of the present invention.

In the step 701 of FIG. 15A, the host processor 1234 supplies a command to request a track jump to the MPU 5. When the MPU 5 receives the command, the MPU 5 obtains a number D of tracks which are to be jumped.

In the step 702, the MPU 5 subtracts two from the above number D, and stores the calculated number D-2 as a renewed number D in the memory 5b in the MPU 5. An acceleration is carried out over the first D-2 tracks, and then a deceleration is carried out over remaining tracks. In the step 702, an acceleration time ta and a deceleration time ta' are calculated and recorded in the memory 5ta in the MPU 5.

In the step 703, a lock on signal LKS is made active to make the lock on switch 37 on and electrically lock the track traversing direction lens actuator 21' at its center position by the track traversing direction lens position signal LPOS. Then, a servo on signal SVS is made inactive to make the servo on switches 35 and 351 off and open the servo loop. Thus, the position of the beam spot on the magneto-optical disc is accurately controlled by the MPU 5. Further, the switch 410 is made on to supply the output of the waveform storage circuit 7 to the adding circuit 412. Since the output of the waveform storage circuit 7 corresponds to the deformation (the eccentricity) of the tracks from a true circle, and is synchronized with the rotation of the magneto-optical disc 1 as explained before, the output of the waveform storage circuit 7 is supplied to the power amplifier 391 through the switch 410 and the adding circuit 412, and therefore, the optical head 2 is moved corresponding to the above deformation (the eccentricity) of the tracks, and the locked optical beam follows the track where the optical beam is impinging at the beginning of the track jump operation.

In the step 704, the MPU 5 determines whether the direction of the track jump is the inner direction or the outer direction a positive velocity command value VCMi=F is supplied to the digital to analog converter 411, to carry out an acceleration, and thus, the output of the digital to analog converter 411 can be applied to the voice coil motor 400. When the inner direction is determined, a negative velocity command value VCMi=F is supplied to the digital to analog converter 411.

In the step 705, the timer 5a is started. The timer 5a counts the above-mentioned acceleration time ta which is memorized in the memory 5ta.

In the step 706, when the above acceleration time ta has been counted, the input into the digital to analog converter 411 is made zero to end the start-up acceleration.

In the step 707, the MPU 5 detects a cycle of the track zero-cross signal TZCS which is supplied from the zero-cross detecting circuit 34a. The cycle is determined from the interval t between the leading edges of the track zero-cross signal as shown in FIG. 16.

Figure 16:
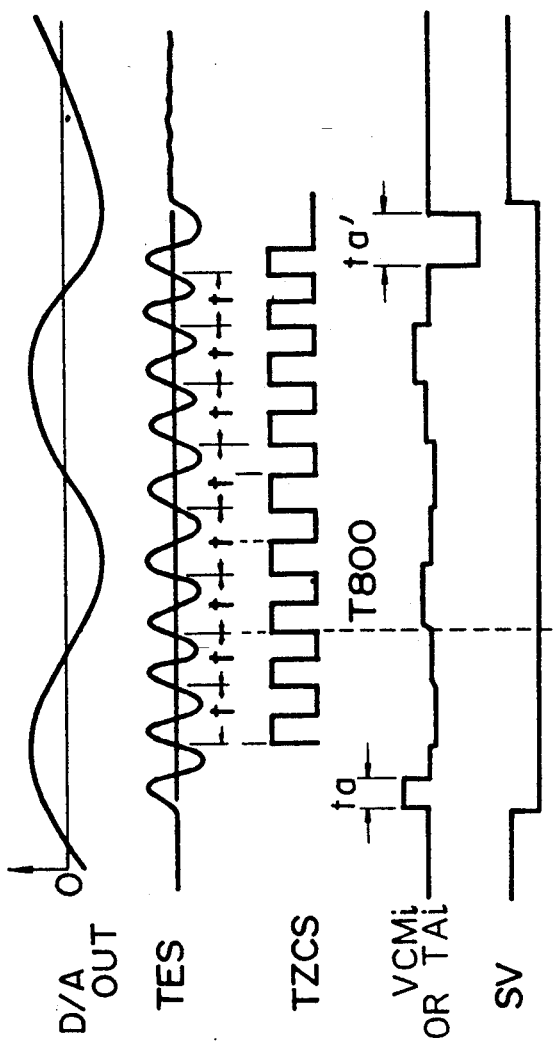
FIG. 16 shows an example of the relationship between signals during a track jump operation in accordance with the first embodiment of the present invention.

In the step 708, a velocity of the beam spot on the magneto-optical disc in the direction traversing the tracks A is obtained by A=C1/t at the timing indicated by T800 in FIG. 16, where C1 is a constant.

In the step 709, a velocity error B is calculated by B=A-C3, where C3 is a target velocity of the beam spot. The target velocity of the beam spot is obtained by the track jump program. Then, in the step 710, a velocity command value VCMi is obtained by VCMi=B.C4, where C4 is a constant. The velocity command value VCMi is output to the digital to analog converter 411. The output of the digital to analog converter 411 is supplied to the adding circuit 412. In the adding circuit 412, the velocity command value VCMi is modified with (added to) the above output of the waveform storage circuit 7. The output of the adding circuit 412 is supplied to the power amplifier 391, and the voice coil motor 400 is driven to cancel the above velocity error B.

In the step 712, the value D is decremented by one, and in the step 713, it is determined whether or not D=d. The value d is a predetermined value to determine a boundary between a region wherein a track jump operation is carried out by a movement of the voice coil motor 400, and a region wherein a track jump operation is carried out by a movement of the track traversing direction lens actuator 21'. When it is determined D≠d, the operation goes to the step 707 and the operations in the steps 707 to 713 are repeated. Or when it is determined YES, the operation goes to the step 714.

In the step 714, a negative or positive velocity command VCMi is supplied to the digital to analog converter 411 according to whether the direction of the above acceleration is the outer direction or the inner direction, to carry out a deceleration.

In the step 715, the timer 5a is started. The timer 5a counts the above-mentioned deceleration time tal' which is memorized in the memory 5ta.

In the step 716, when the above acceleration time ta has been counted, the input into the digital to analog converter 411 is made zero to end the above deceleration.

In the step 701', the lock switch 37 is made open.

In the steps 702' to 716', operations similar to the operations in the steps 702 to 716 except for the step 703, are carried out for driving the track traversing direction lens actuator 21'. The same references with a prime in the steps 702' to 716', respectively correspond to the similar values in the steps 702 to 716.

In the step 702', the MPU 5 subtracts two from the above number D, and stores the calculated number D-2 as a renewed number D in the memory 5b in the MPU 5. An acceleration is carried out over the first D-2 tracks, and then a deceleration is carried out over remaining tracks. In the step 702', an acceleration time tal and a deceleration time tal' are calculated and recorded in the memory 5ta in the MPU 5.

In the step 703', the switch 410' is made on to supply the output of the waveform storage circuit 7 to the adding circuit 412'. The output of the waveform storage circuit 7 is supplied to the track traversing direction lens actuator 21' through the switch 410' and the adding circuit 412', and therefore, the beam spot is moved corresponding to the above deformation (the eccentricity) of the tracks again, and the locked optical beam follows the track where the optical beam is impinging at the beginning of the track jump operation by the track traversing direction lens actuator 21'.

In the step 706', when the above acceleration time ta has been counted, the input into the digital to analog converter 411' is made zero to end the above acceleration.

In the step 707', the MPU 5 detects a cycle of the track zero-cross signal TZCS which is supplied from the zero-cross detecting circuit 34a from the interval t' of leading edges of the track zero-cross signal TZCS.

In the step 708', a velocity of the beam spot on the magneto-optical disc in the direction traversing the tracks A' is obtained by A'=C1'/t', where C1' is a constant.

In the step 709, a velocity error B, is calculated by B,=A'-C3', where C3' is a target velocity of the beam spot. The target velocity of the beam spot is obtained by the track jump program. Then, in the step 710', a velocity command value TAi is obtained by TAi=B'.C4', where C4' is a constant. The velocity command value TAi is output to the digital to analog converter 411'. The output of the digital to analog converter 411' is supplied to the adding circuit 412'. In the adding circuit 412', the velocity command value TAi is modified with (added to) the above output of the waveform storage circuit 7. The output of the adding circuit 412' is supplied to the power amplifier 39 through the adding circuits 40 and 35', and the track traversing direction lens actuator 21' is driven to cancel the above velocity error B'. As the velocity command is corrected by the information on the acceleration which is necessary to follow the deformation (eccentricity) of the track, the track jump operation is carried out accurately and stably.

In the step 712', the value D is decremented by one, and in the step 713', it is determined whether or not D=0. When it is determined D≠0, the operation goes to the step 707' and the operations in the steps 707' to 713 are repeated. Or when it is determined YES, the operation goes to the step 714'.

In the step 714', a negative or positive velocity command TAi is supplied to the digital to analog converter 411' according to whether the direction of the above acceleration is the outer direction or the inner direction, to carry out a deceleration.

In the step 715', the timer 5a is started. The timer 5a counts the above-mentioned deceleration time tal' which is memorized in the memory 5ta.

In the step 716', when the above acceleration time ta has been counted, the input into the digital to analog converter 411' is made zero to end the above deceleration.

In the step 717', the above servo switches 35 and 351 are made on, and then, the switches 410 and 410' are made off to carry out a servo pull-in. The servo operation is determined to be stable when no off-track signal is detected and the track zero-cross signal TZCS is not detected for a predetermined time. Thus, the track servo operation is restarted.

Track Access Control Circuit in the Second Embodiment

Figure 17A:
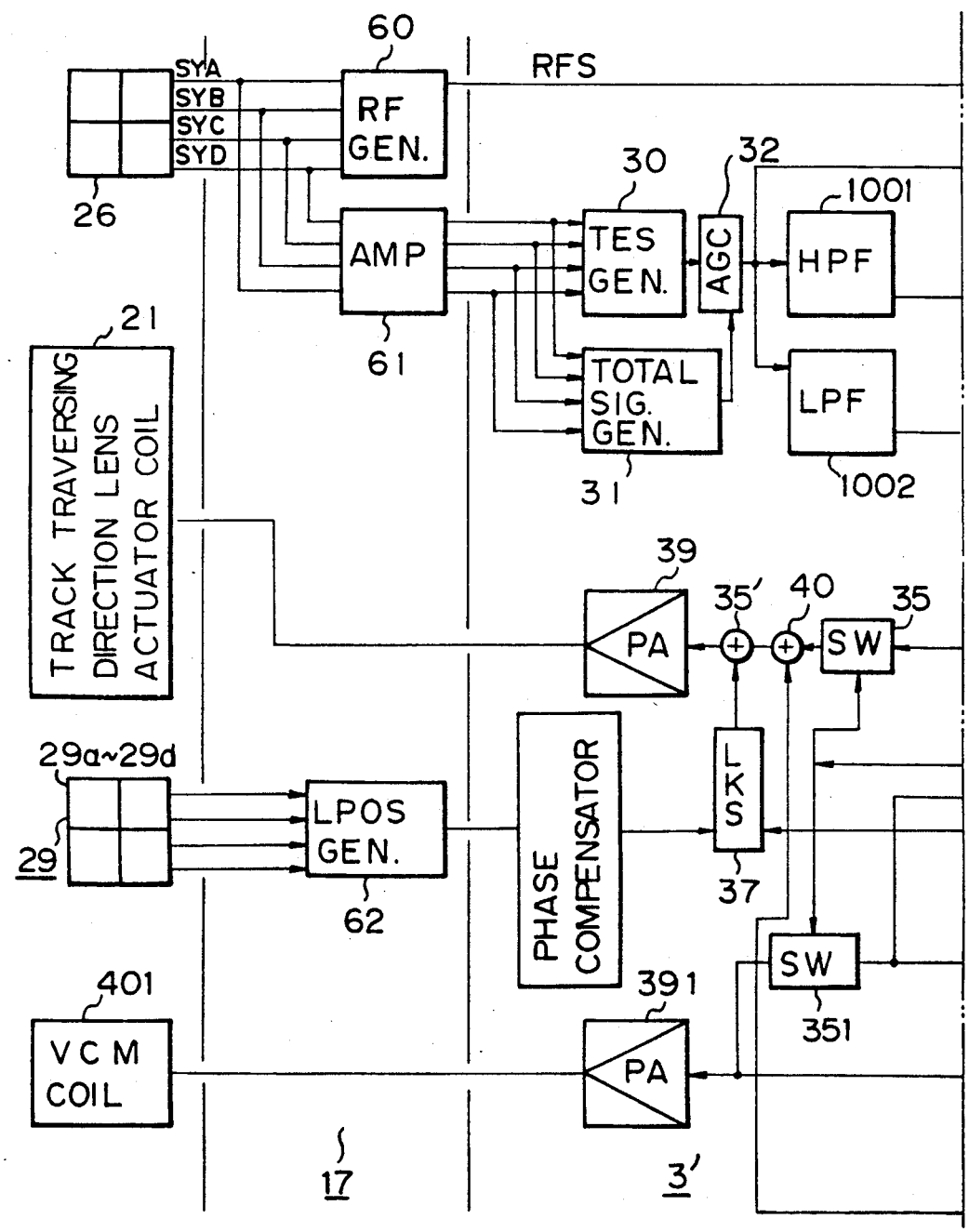
FIGS. 17A and 17B show a construction for the track servo control in accordance with the second embodiment of the present invention.
Figure 17B:
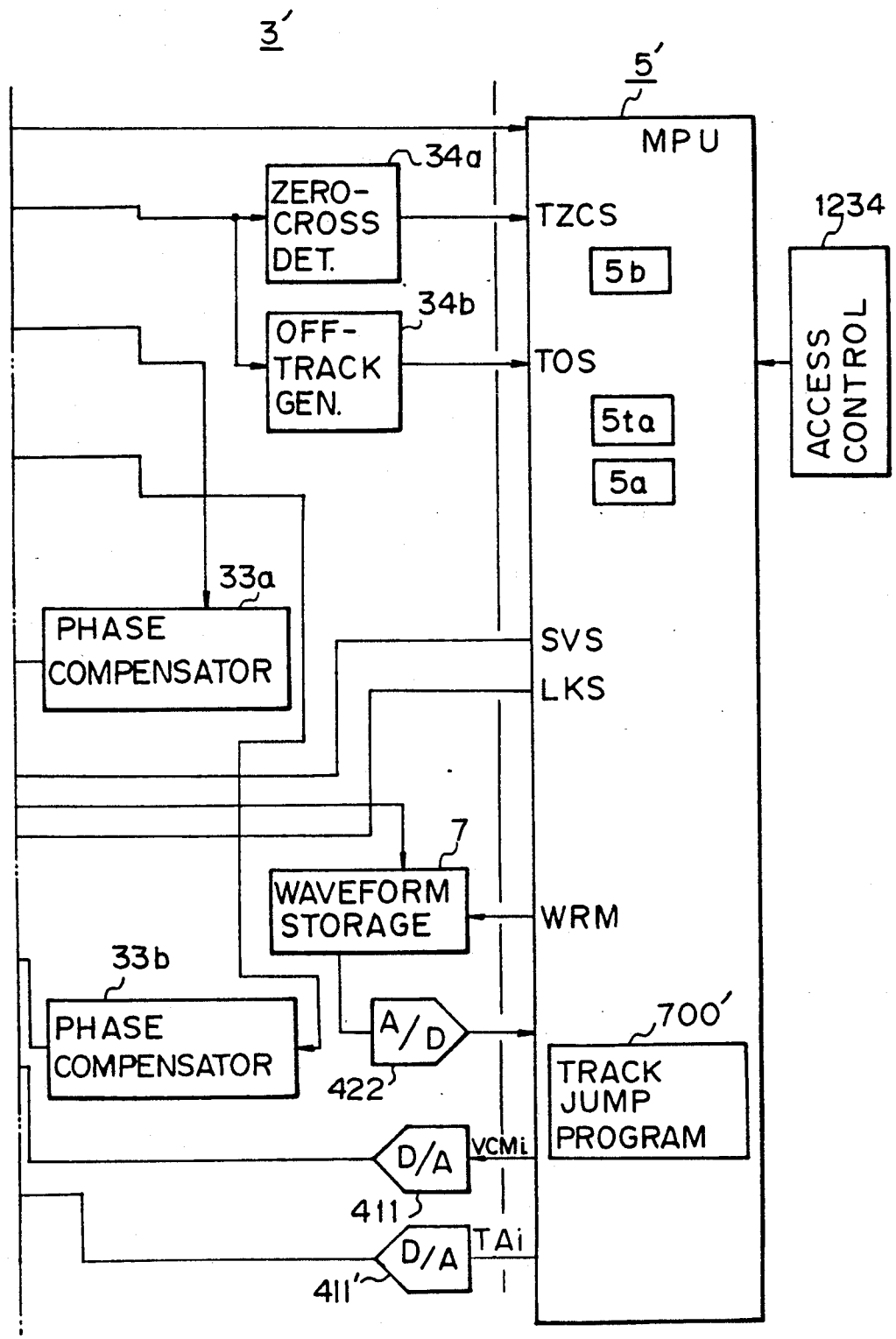

FIGS. 17A and 17B show a construction for the track servo control in the second embodiment of the present invention.

FIGS. 17A and 17B, reference numeral 422 denotes an analog to digital converter. The analog to digital converter 422 is connected to the output terminal of the waveform storage circuit 7, and the output of the analog to digital converter 422 is supplied to the MPU 5. The adding circuit 412 which is provided in the construction of FIGS. 11A and 11B in the first embodiment of the present invention, is not provided in the second embodiment of the present invention. The aforementioned modification of the velocity command using the output of the waveform storage circuit 7, is carried out by the MPU 5' in the second embodiment of the present invention, as explained below. All the other construction of FIGS. 17A and 17B is the same as the construction of FIGS. 11A and 11B.

The control process of a track jump operation in the MPU 5 in the second embodiment of the present invention, is the same as the first embodiment except as explained below.

When the procedure of FIGS. 15A and 15B are applied in the second embodiment, the output of the analog to digital converter 422 is sampled before the step 708 of FIG. 15A and a velocity of the beam spot on the magneto-optical disc in the direction traversing the tracks A is obtained by $A=C1/t+C2 \cdot i$, instead of $A=C1/t$ at the timing indicated by T800 in FIG. 16, where C2 is another constant and i denotes the above sampled value from the waveform storage circuit 7. In addition, similarly, the output of the analog to digital converter 422 is sampled before the step 708′ of FIG. 15B and a velocity A′ of the beam spot on the magneto-optical disc in the direction traversing the tracks is obtained by $A'=C1'/t'+C2' \cdot i$, instead of $A'=C1'/t'$ at the timing indicated by T800 in FIG. 16, where C2′ is another constant and i denotes the above sampled value.

Track Access Control Circuit in the Third Embodiment

Figures 18, 18A:
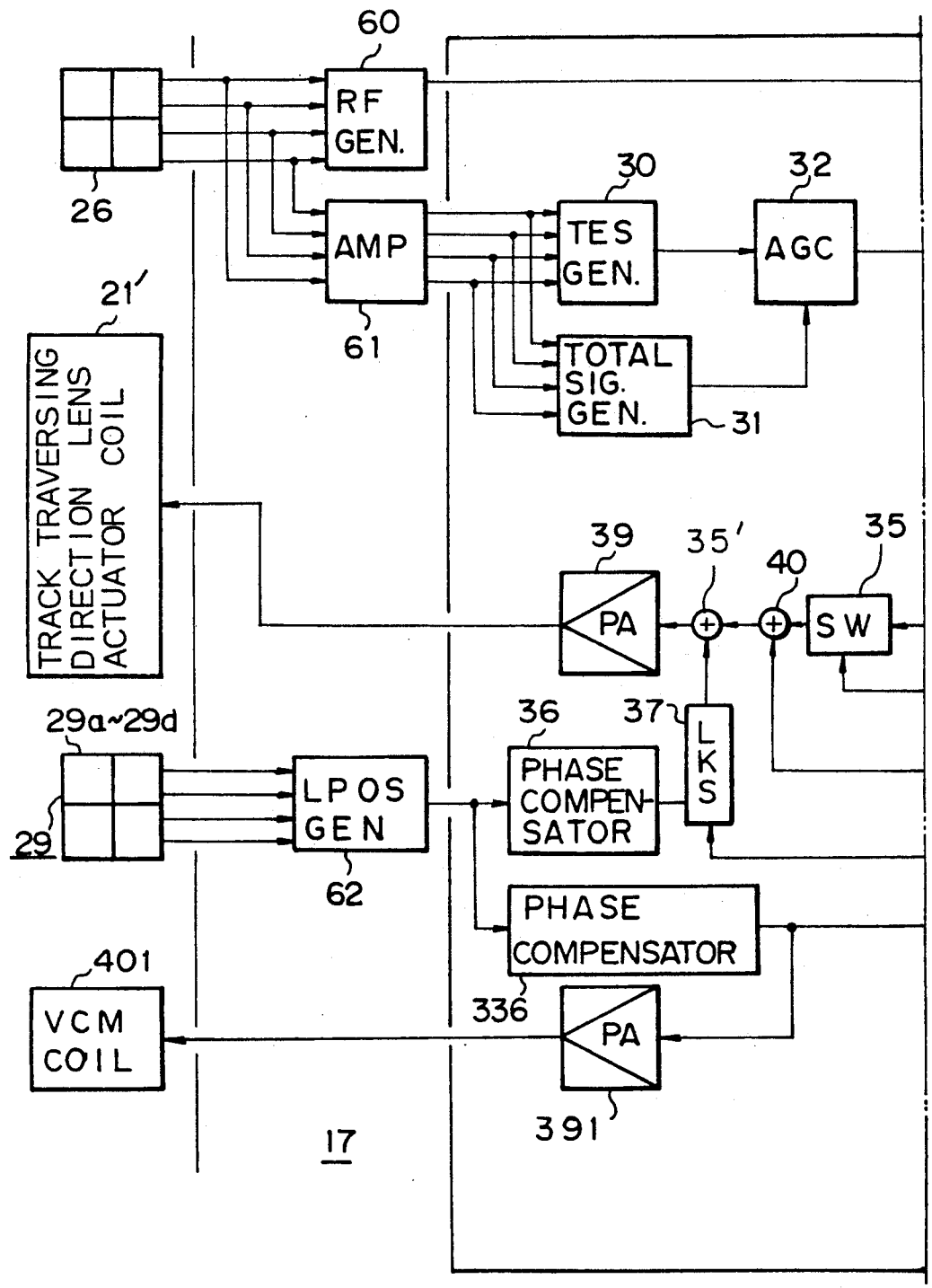
FIGS. 18A and 18B show a construction for the track servo control in the third embodiment of the present invention.
Figure 18B:
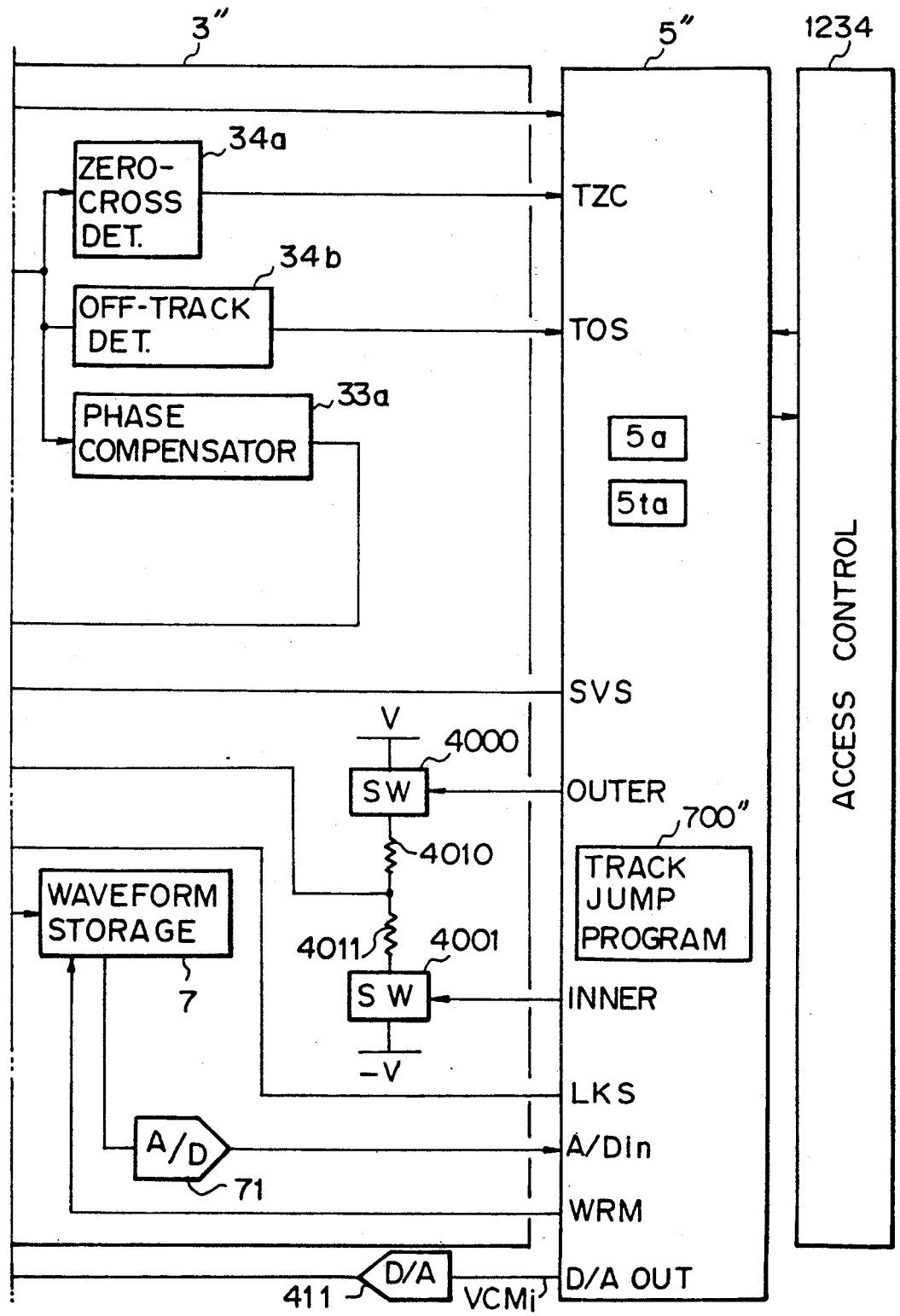

FIGS. 18A and 18B show a construction for the track servo control in the third embodiment of the present invention.

In FIGS. 18A and 18B, reference numeral 4000 denotes an outer switch, 4001 denotes an inner switch, and 4010 and 4011 each denote a resistor. The switch 4000, the resistor 4010, the resistor 4011, and the switch 4001 are connected in series between a high voltage source V and a low voltage source $-V$. The connection point between the resistors 4010 and 4011, instead of the output of the digital to analog converter 412 of FIGS. 17A and 17B is connected to an input terminal of the adding circuit 40. The outer switch 4000 and the inner switch 4001 are respectively controlled by an outer signal and an inner signal which are respectively supplied from the MPU 5. When an active outer signal is output from the MPU 5, the outer switch 4000 is made on, and a high voltage signal is applied through the adding circuit 40 to the track traversing direction lens actuator 21′ to move the beam spot in the outer direction of the magneto-optical disc. Or when an active inner signal is output from the MPU 5″, the inner switch 4001 is made on, and a low voltage signal is applied through the adding circuit 40 to the track traversing direction lens actuator 21′ to move the beam spot in the inner direction of the magneto-optical disc. The amount of the acceleration or deceleration is controlled by the duration of the active outer or inner signal In addition, reference numeral 336 in FIGS. 18A and 18B denotes a phase compensation circuit. The phase compensation circuit 336 advances the phase of LPOS signal generation circuit 62 by adding a differential of the LPOS signal generation circuit 62 and a component proportional to the LPOS signal generation circuit 62. In the construction of FIGS. 18A and 18B the phase of the track traversing direction lens position signal LPOS from the LPOS signal generation circuit 62 is advanced in the phase compensation circuit 336, and the output of the phase compensation circuit 336 is constantly supplied to the power amplifier 391 to drive the voice coil motor 400 for moving the optical head 2 to reduce a deviation of the position $\alpha$ of the object lens 20 from its center position, i.e., to maintain the position $\alpha$ of the object lens 20 near its center position. Namely, in the construction of FIGS. 18A and 18B, the movement of the voice coil motor 400 is controlled responding to the track traversing direction lens position signal LPOS, instead of the low frequency component of the track error signal TES.

The digital to analog converter 411′ which is provided in the construction of FIGS. 17A and 17B in the second embodiment of the present invention, is not provided in the third embodiment of the present invention. The aforementioned modification of the velocity command using the output of the waveform storage circuit 7, is carried out in the third embodiment of the present invention, as explained later. All the other construction of FIGS. 18A and 18B is the same construction of FIGS. 17A and 17B.

The control process of a track jump operation in the MPU 5″ in the third embodiment of the present invention, is the same as the second embodiment except explained below.

The procedure of FIGS. 15A and 15B can be applied in the third embodiment except for the process for the acceleration of the track traversing direction lens actuator 21′ in the steps 704′ to 706′, the process for the deceleration of the track traversing direction lens actuator 21′ in the steps 714′ to 716′, and the process shown in the rectangle 734′.

The process for the acceleration of the track traversing direction lens actuator 21′ in the steps 704′ to 706′, is replaced with an output of the outer or inner signal according to whether the requested track jump is in the outer direction or in the inner direction, respectively, for a duration which is calculated based on the number of tracks which is requested by the host processor 1234.

The process for the deceleration of the track traversing direction lens actuator 21′ in the steps 714′ to 716′, is replaced with an output of the inner or outer signal according to whether the requested track jump is in the outer direction or in the inner direction, respectively, for a duration which is calculated based on the number of tracks which is requested by the host processor 1234.

Figure 19:
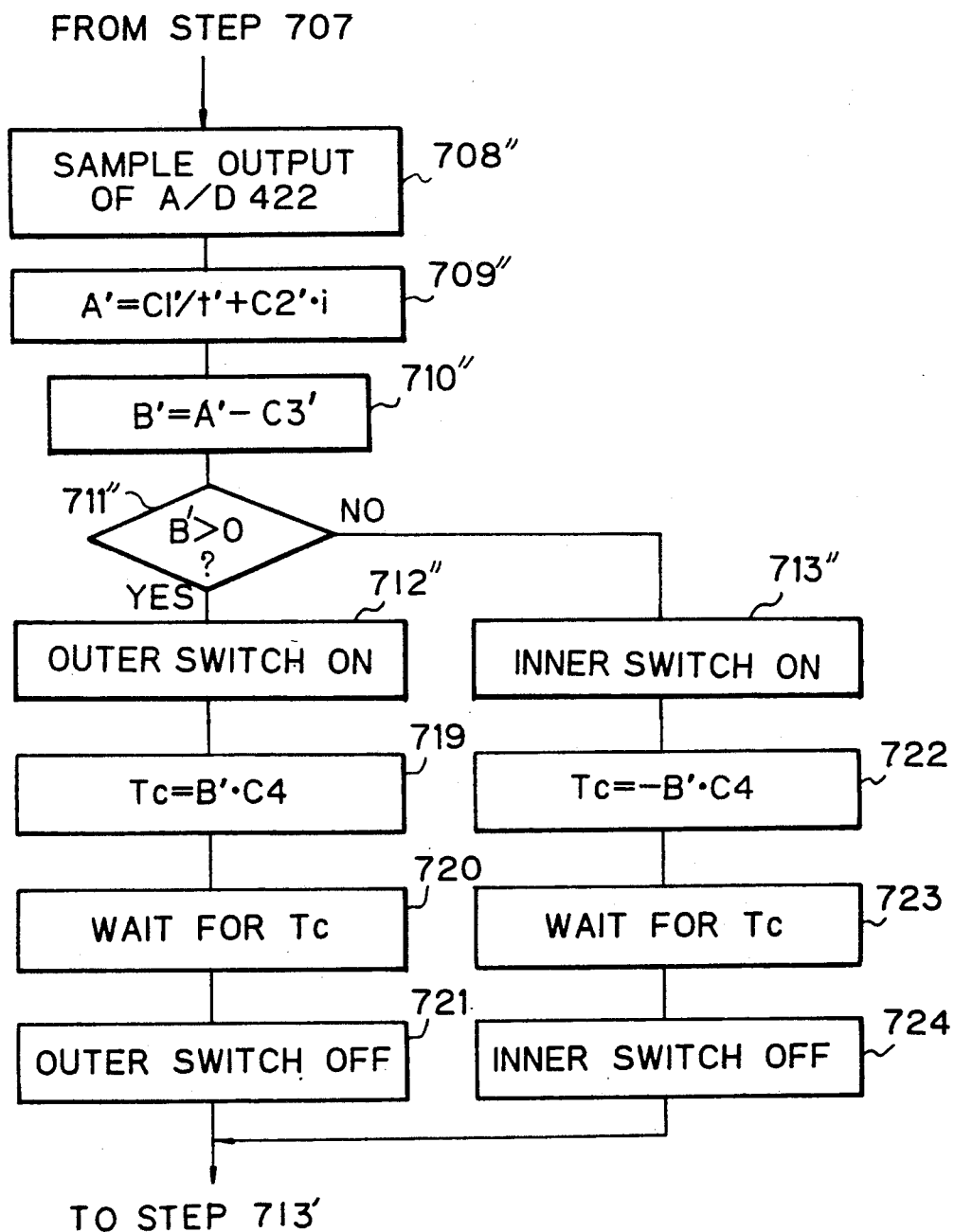
FIG. 19 shows a control process of a track jump operation in the MPU 5 in accordance with the third embodiment of the present invention.

The replacement process for the process 734 in FIG. 15A is shown in FIG. 19. In FIG. 19, the operations in the steps 708″ to 710″ are the same as the corresponding operations in the second embodiment. In the step 711″, it is determined whether or not the modified velocity command value B, is positive. When it is determined positive, the operation goes to the step 712″, or when it is determined not positive, the operation goes to the step 713″. In the step 712″, the outer switch 4000 is made on. Then, in the step 719, the time Tc for maintaining the outer switch 4000 on by $Tc=B'\cdot C4$, and in the step 720, the MPU 5″ waits for the time Tc. When the time Tc is counted, the outer switch 4000 is made off in the step 721.

In the step 713″, the inner switch 4001 is made on. Then, in the step 722, the time Tc for maintaining the outer switch 4000 on by $Tc=-B'\cdot C4$, and in the step 723, the MPU 5″ waits for the time Tc. When the time Tc is counted, the inner switch 4001 is made off in the step 724. Then, the operation goes to the step 713′ shown in FIG. 15B.

Figure 20:
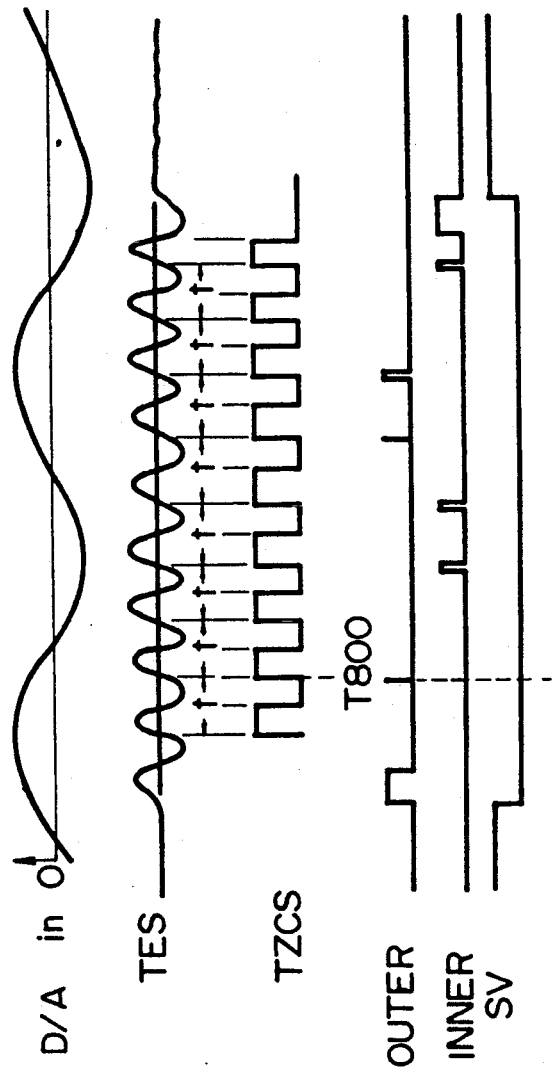
FIG. 20 shows an example of the relationship between signals during a track jump operation in accordance with the third embodiment of the present invention.

An example of the relationship between the above-mentioned signals during a track jump operation in the third embodiment of the present invention, is shown in FIG. 20.

The above-explained first to third embodiments of the present invention correspond to the aforementioned first aspect of the present invention.

Fourth and Fifth Embodiments

As mentioned before, in the non-overwritable magneto-optical discs, an erasing operation is necessary before each writing operation. Therefore, in the prior art, two disc rotation cycles are necessary to write data on a track for the erasing operation and the writing operation. This delays the writing operation. To eliminate the above delay, an optical system for outputting both the erasing beam and the writing beam from two object lenses is mounted on an optical head so that the erasing of the track is carried out before the writing operation on the track.

In the non-overwritable magneto-optical discs which employ the above optical head, the following are required: the erasing beam and the following writing beam must be impinged on the same track; the erasing beam and the writing beam are apart from each other: and high accuracy and stability are required for the positioning of the writing beam. In particular, to improve the accuracy of the positioning of the writing beam, it is desirable to reduce the amount of error signal in the track servo operation for the writing/reading beam even when the tracks are deformed, for example, eccentrically. To fulfill the above requirements, the second aspect of the present invention is provided.

Figure 21:
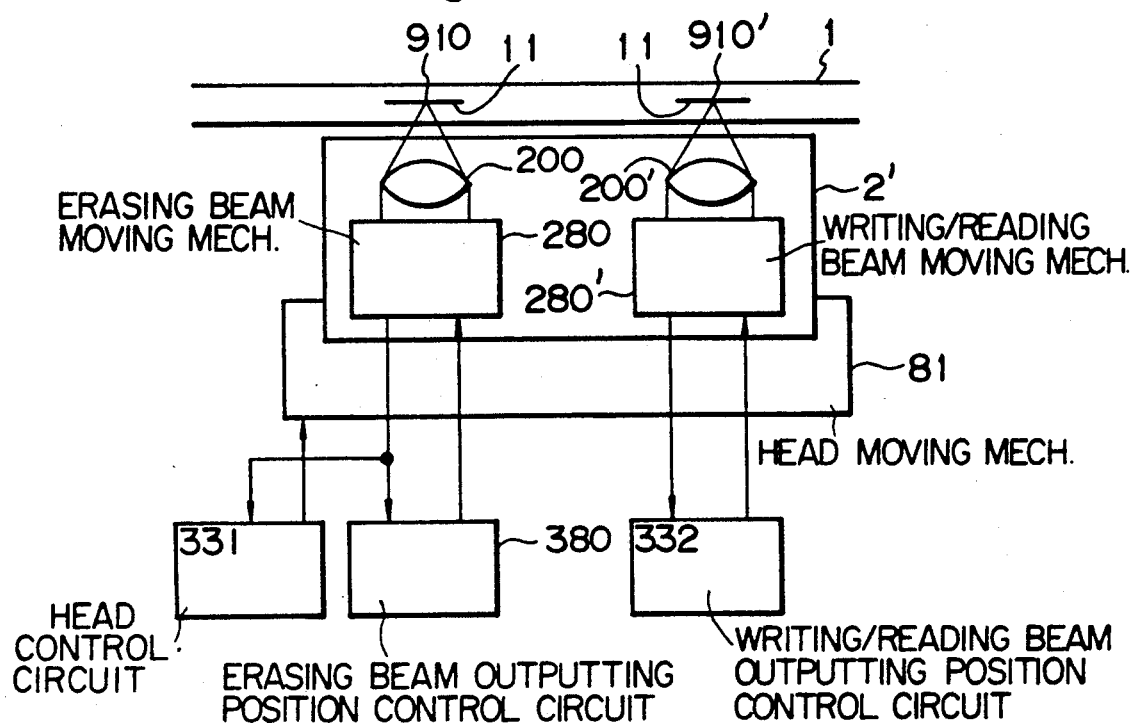
FIG. 21 shows an outline of the construction of a track access system in a magneto-optical disc device in accordance with the fourth and fifth embodiments of the present invention.

FIG. 21 shows an outline of the construction of a track access system in a magneto-optical disc device in the fourth and fifth embodiments of the present invention.

Figure 22:
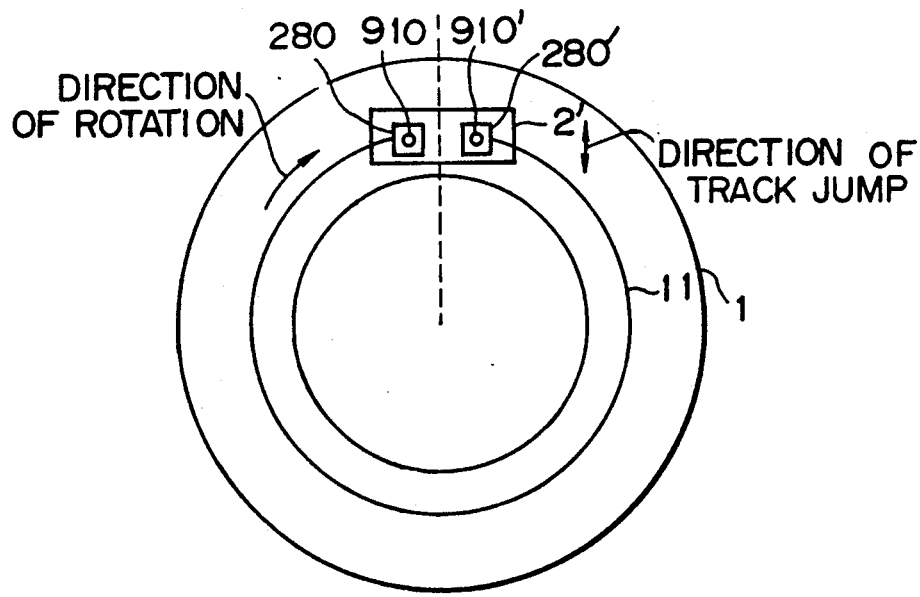
FIG. 22 is a plan view of the construction of FIG. 21.

In FIG. 21, reference numeral 1 denotes a magneto-optical disc, 2' denotes an optical head, 831 denotes a head control circuit, 380 denotes an erasing beam outputting position control circuit, and 332 denotes a writing/reading beam outputting position control circuit, 200 and 200' each denote an object lens, 280 denotes an erasing beam outputting position moving mechanism, 280' denotes a writing/reading beam outputting position moving mechanism, and 81 denotes a head moving mechanism. Further, reference numeral 910 denotes a position of an erasing beam spot, 910' denotes a position of a writing/reading beam spot, and 11 denotes a track on which the erasing beam and the writing/reading beam are impinging. FIG. 22 is a plan view of the construction of FIG. 21.

The erasing beam outputting position moving mechanism 280 and the writing/reading beam outputting position moving mechanism 280, respectively contain the constructions as explained in FIGS. 1 to 8. The head moving mechanism 81 has a construction as shown in FIGS. 9 and 10.

Figure 23B:
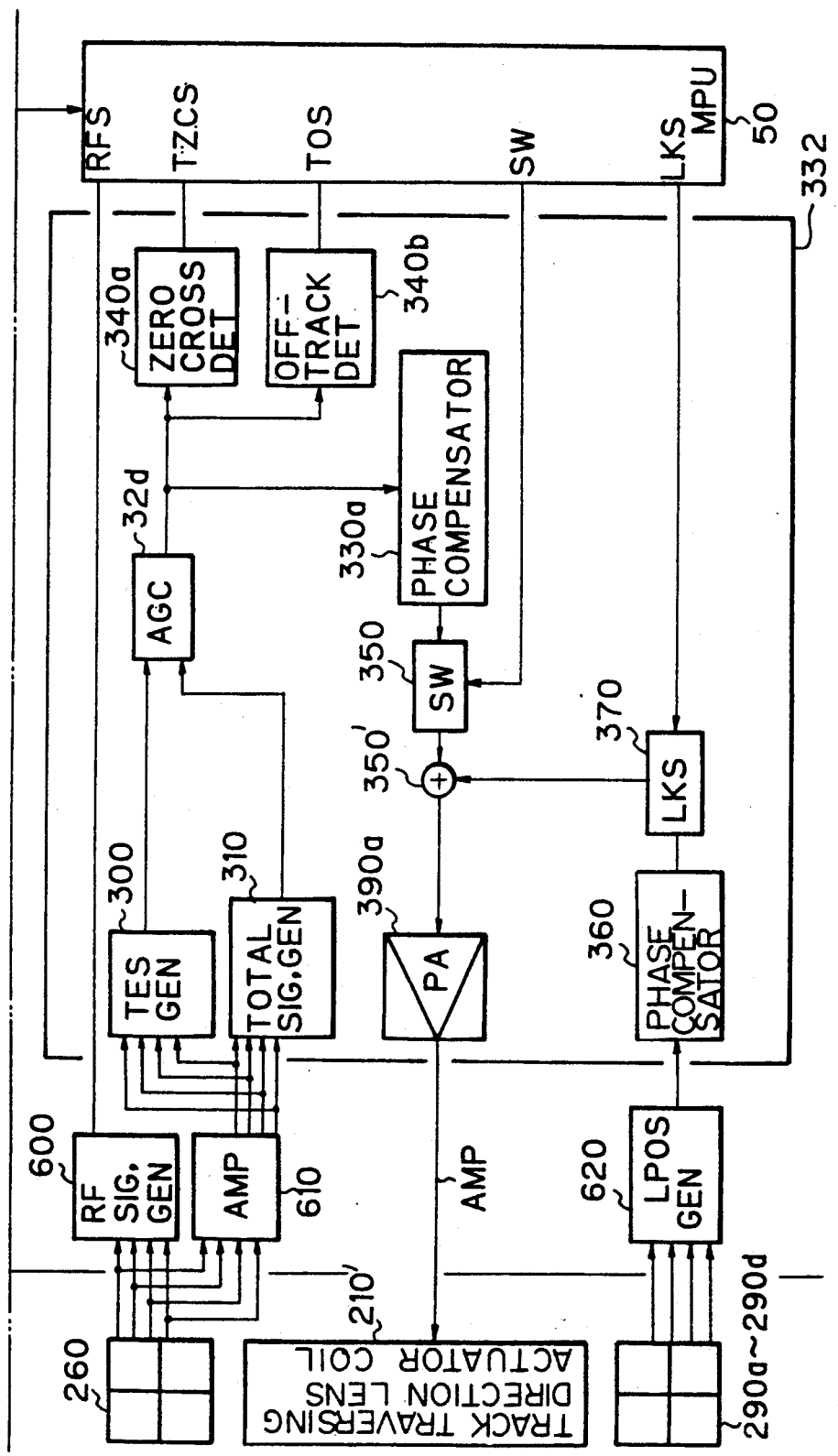

FIGS. 23A and 23B show a construction for the track servo control including the head servo control circuit 331, the erasing beam outputting position control circuit 380, and the writing/reading beam outputting position control circuit 332 of FIGS. 21 and 22, in the fourth embodiment of the present invention.

As readily understood, the constructions of the erasing beam outputting position control circuit 380 and the construction of the head servo control circuit 331 in FIGS. 23A and 23B, are the same as the constructions shown in FIGS. 11A and 11B except for the construction for the track jump operation, and except that the construction is for the track servo operation of the erasing beam. The construction of the writing/reading beam outputting position control circuit 332 in FIGS. 23A and 23B, is the same as the construction of FIGS. 18A and 18B except for the construction for the track jump operation and the construction for controlling the voice coil motor shown in FIGS. 18A and 18B.

According to the above construction, a double servo operation is carried out at the position of the erasing beam, where the double servo operation consists of a first track servo loop using the high frequency component of the track error signal TES which is obtained at the erasing beam and driving the track traversing direction lens actuator 21' for the erasing beam, and a second track servo loop using the low frequency component of the track error signal TES which is obtained at the erasing beam, and driving the voice coil motor 81. At the same time, a third track servo operation is carried out using the track error signal TES which is obtained at the erasing beam, and driving the track traversing direction lens actuator 210' for the writing/reading beam.

Figure 24B:
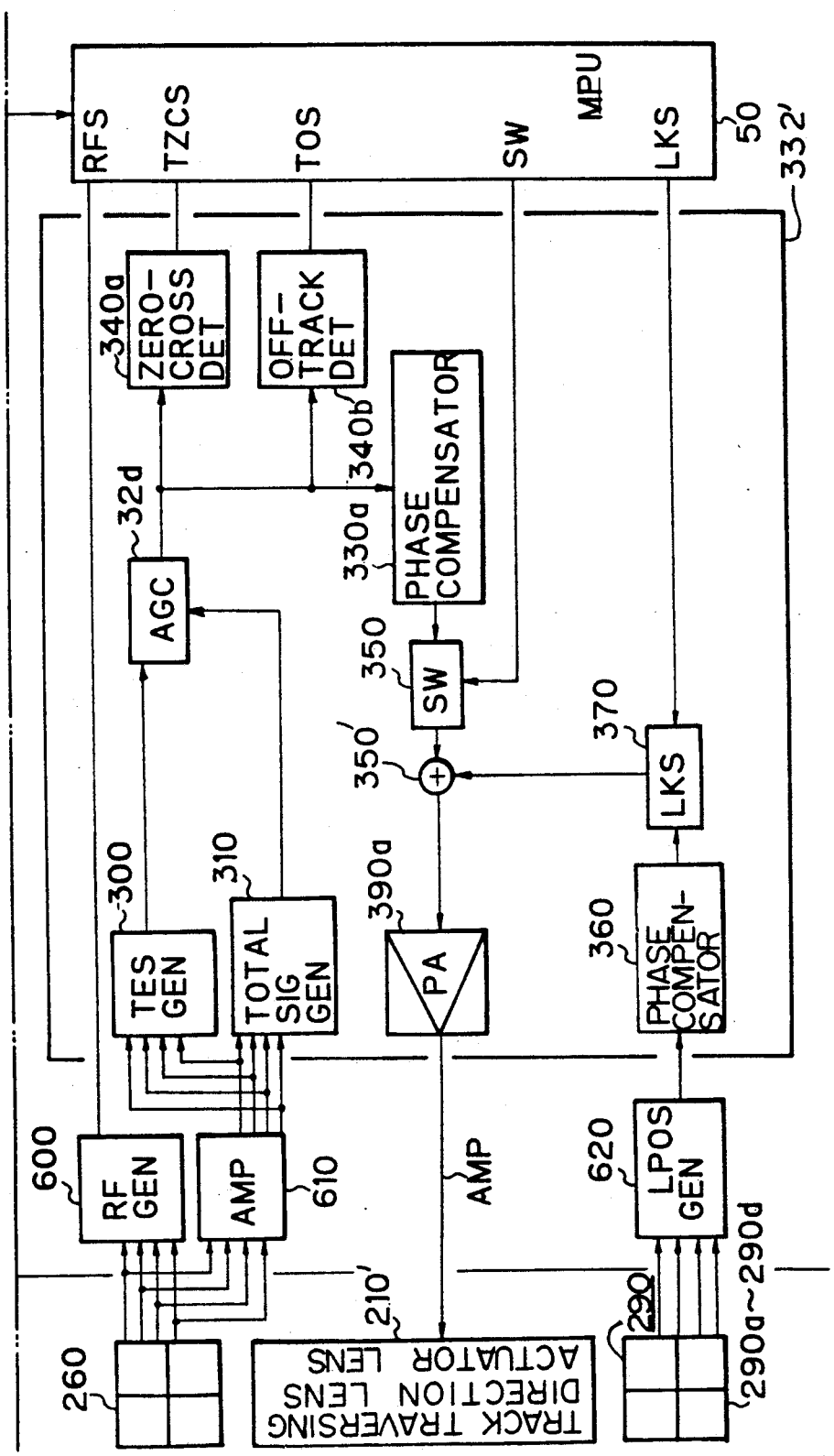

FIGS. 24A and 24B show a construction for the track servo control including the head servo control circuit 331, the erasing beam outputting position control circuit 380, and the writing/reading beam outputting position control circuit 332 of FIGS. 21 and 22, in the fifth embodiment of the present invention. In FIGS. 24A and 24B, the reference numerals of these components are shown with a prime '.

As readily understood, the constructions of the erasing beam outputting position control circuit 380' and the construction or the head servo control circuit 331' in FIGS. 24A and 24B are the same as the constructions shown in FIGS. 18A and 18B except for the construction for the track jump operation, and except that the construction is for the track servo operation of the erasing beam. The construction of the writing/reading beam outputting position control circuit 332' in FIGS. 24A and 24B, is the same as the construction of FIGS. 18A and 18B except for the construction for the track jump operation and the construction for controlling the voice coil motor shown in FIGS. 18A and 18B. Namely, in the fifth embodiment, the voice coil motor 81 is controlled responding to the track traversing direction lens position signal LPOS of the erasing beam.

Since, generally, servo systems have a delay in controlling a control quantity depending on a response speed of the servo control system, when the radius of the track varies due to the eccentricity of the track, an inevitable amount of delay arises in controlling the erasing beam position to follow the track in the double servo system. In particular, the eccentricity of the track contributes the low frequency component of the track error signal which controls the movement of the voice coil motor. Therefore, the optical head mounting both the object lenses for the erasing beam and the writing/reading beam, is moved responding to the deviation of the position of the erasing beam which is detected at the position of the erasing beam, with the above delay, so that the deviation is reduced. As the phase (in the rotation of the disc) of the erasing beam precedes the phase of the writing/reading beam by a predetermined amount, the position of the writing/reading beam is corrected responding to the deviation of the position of the erasing beam which is detected at the position of the erasing beam, i.e., the position of the writing/reading beam is corrected responding to the information on the deviation of the track in the preceding phase. Thus, a part or all of the above delay which appears as an error (the amplitude of the track error signal) can be canceled in the track servo control operation, depending on the phase difference between the positions of the erasing beam and the writing/reading beam. Since all the above delay is canceled when the amount of the above delay in the track servo operation at the position of the erasing beam is equal to the phase difference between the erasing beam and the writing/reading beam which is determined by the relative position of the erasing beam regarding to the position of the writing/reading beam, the construction according to the second aspect of the present invention is particularly effective in the above arrangement. Namely, the track servo control operation of the writing/reading beam becomes stable and accurate by carrying out the above double servo operation using the track error signal which is detected at the position of the erasing beam.

Sixth and Seventh Embodiments

The sixth and seventh embodiments of the present invention which correspond to the aforementioned third aspect of the present invention, are provided to reduce the amount of error signal in the track jump operation for the writing/reading beam even when the tracks are deformed, for example, eccentrically. In the sixth and seventh embodiments of the present invention, an optical system for outputting both the erasing beam and the writing beam from two object lenses is mounted on an optical head so that the erasing of the track is carried out just before the writing operation on the track in a non-overwritable magneto-optical disc device.

Figure 25:
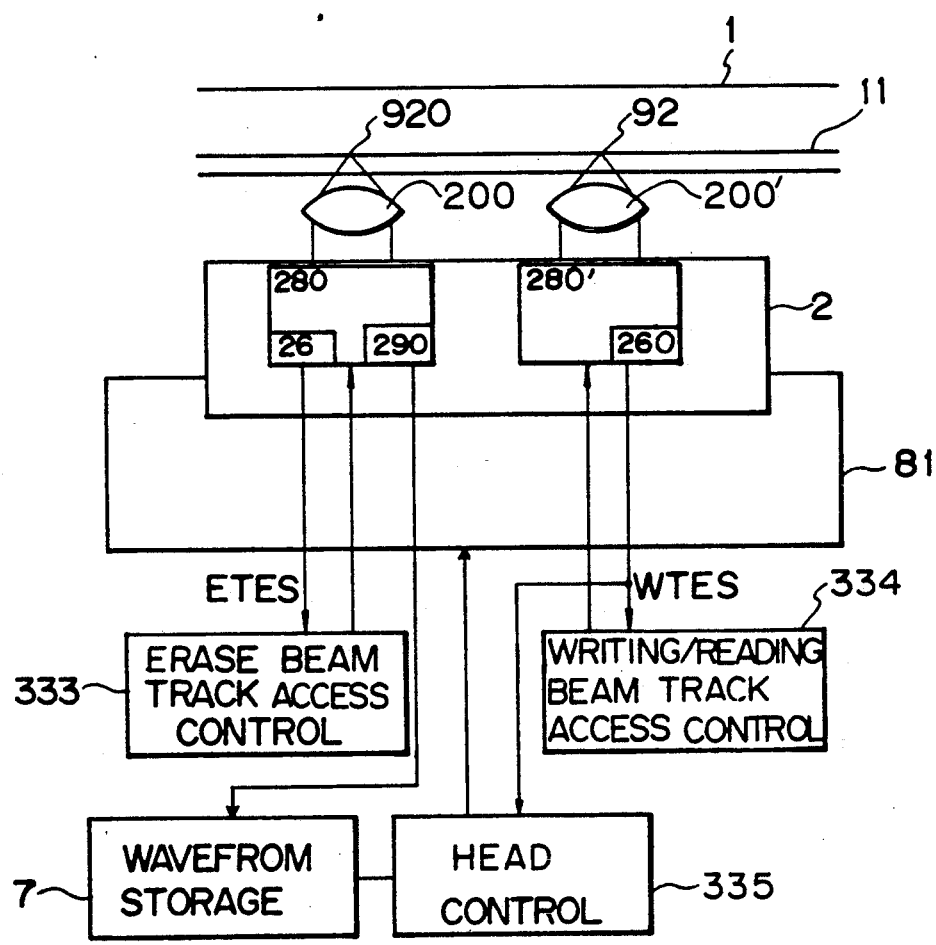
FIG. 25 shows the voice coil motor 400 which moves the optical head 2.

FIG. 25 shows an outline of the construction of a track access system in a magneto-optical disc device in the sixth and seventh embodiments of the present invention.

In FIG. 25, reference numeral 1 denotes a magneto-optical disc, 2' denotes an optical head, 335 denotes a head control circuit, 333 denotes an erasing beam outputting position control circuit, and 334 denotes a writing/reading beam outputting position control circuit, 200 and 200' each denote an object lens, 280 denotes an erasing beam outputting position moving mechanism, 280' denotes a writing/reading beam outputting position moving mechanism, 26 and 260 each denote a quartering light sensing device for detecting a track error signal, 290 denotes a quartering light sensing device for detecting a track traversing direction lens position signal in the track traversing direction, and 81 denotes a head moving mechanism. Further, reference numeral 910 denotes a position of an erasing beam spot, 910' denotes a position of a writing/reading beam spot, and 11 denotes a track on which the erasing beam and the writing/reading beam are impinging.

The erasing beam outputting position moving mechanism 280 and the writing/reading beam outputting position moving mechanism 280, respectively contain the constructions as explained in FIGS. 1 to 8. The head moving mechanism 81 has a construction as shown in FIGS. 9 and 10.

FIGS. 26, 27A, 27B and 28 show a construction for the track access control, including the head control circuit 335, the erasing beam track access control circuit 333, and the writing/reading beam track access control circuit 334 of FIG. 25, in the sixth embodiment of the present invention.

Figure 26:
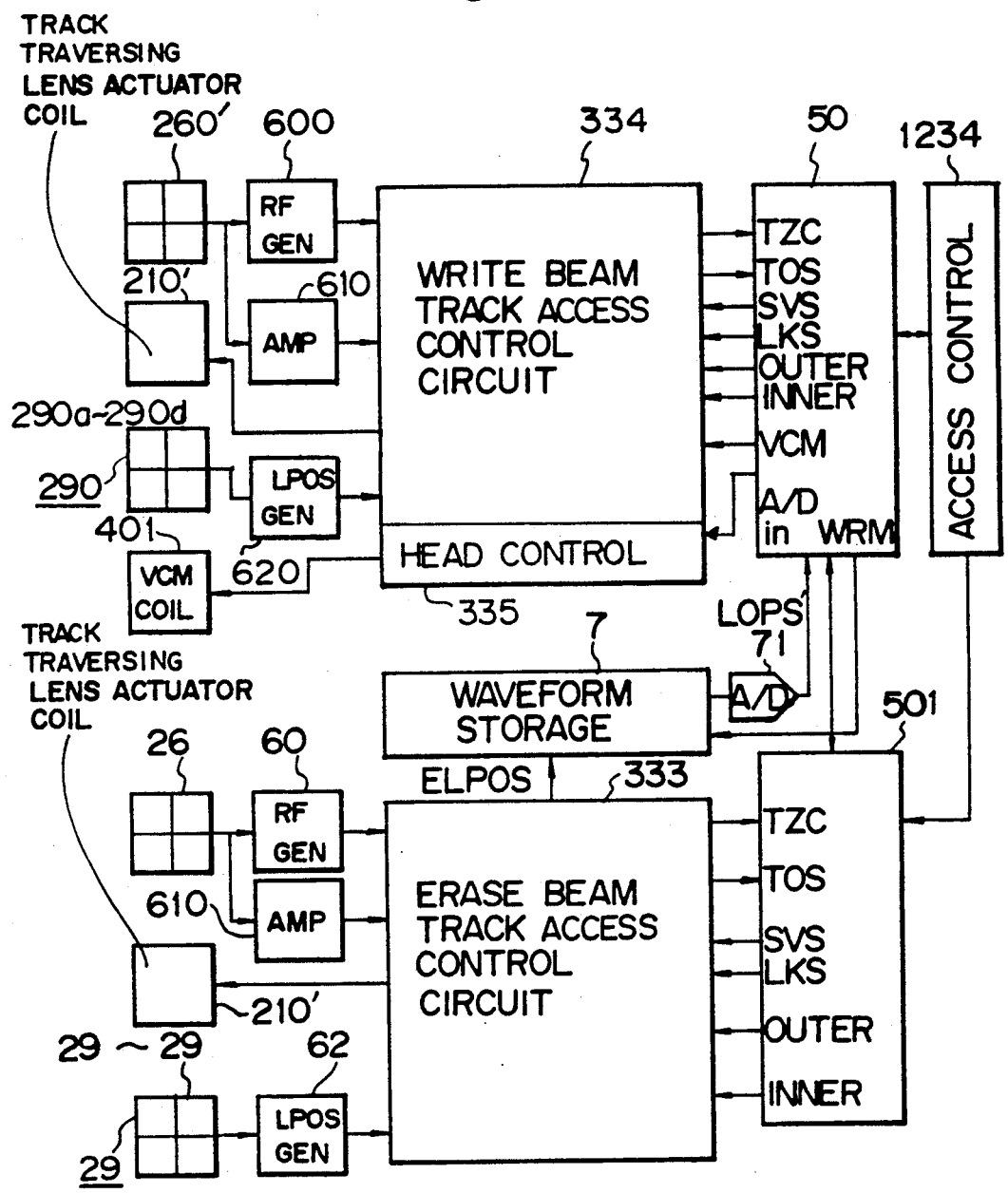
Figure 27B:
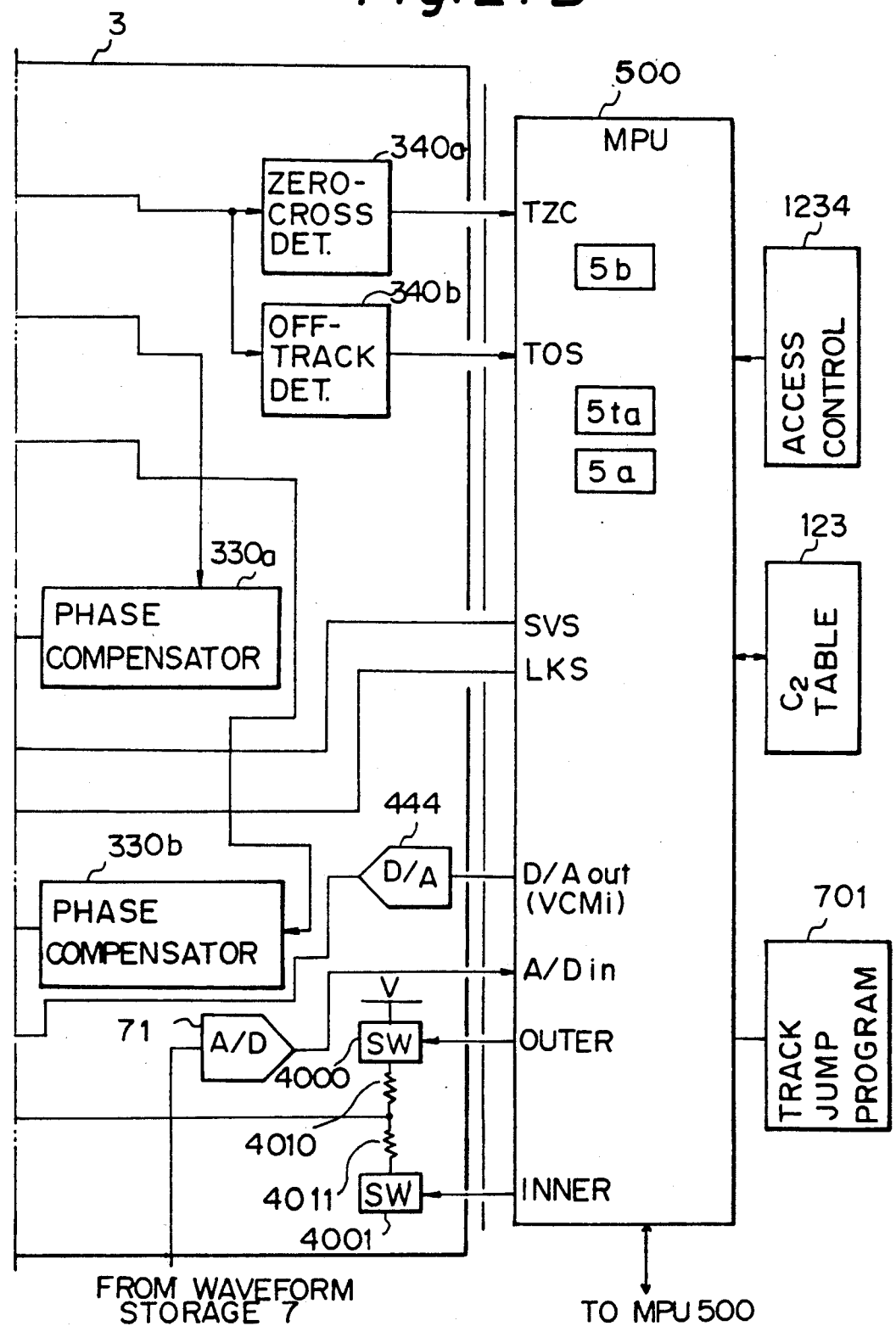
Figure 28:
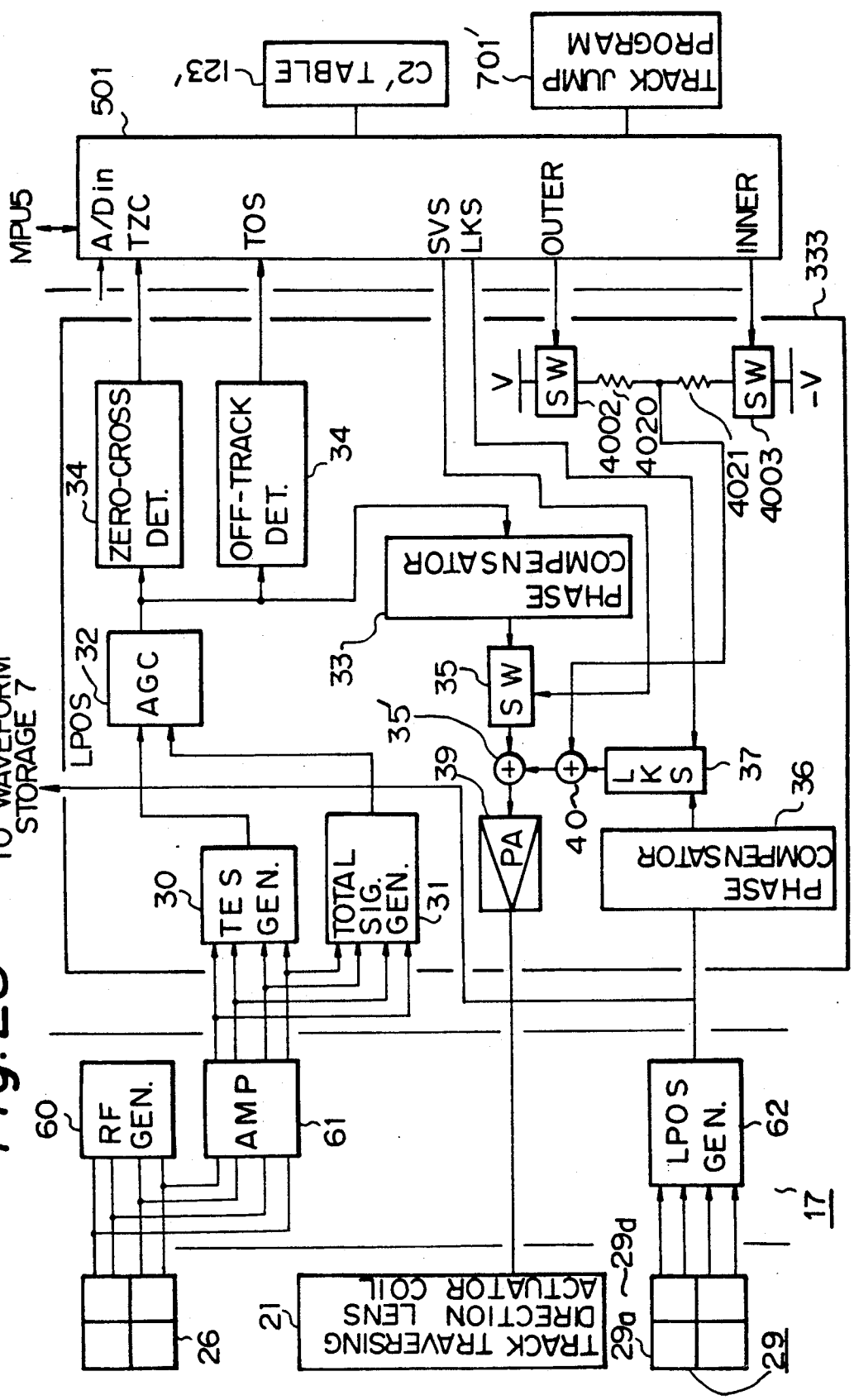

As readily understood, the constructions of the writing/reading beam track access control circuit 334, the construction of the head control circuit 335, and the waveform storage circuit 7 in FIGS. 26, 27A and 27B, are the same as the constructions shown in FIGS. 17A and 17B except for the construction for driving the track traversing direction lens actuator, and the input of the waveform storage circuit 7. The construction of the erasing beam track access control circuit 332 in FIGS. 26 and 28, is the same as the construction of FIGS. 18A and 18B except that the construction for controlling the voice coil motor is not provided in the construction of FIG. 28.

In the construction of FIGS. 27A and 27B, the track traversing direction lens position signal which is obtained from the lens position signal generation circuit 62 in the erasing beam moving mechanism 280, is input into the waveform storage circuit 7, instead of the track traversing direction lens position signal which is obtained from the lens position signal generation circuit in the writing/reading beam moving mechanism 280'.

In addition, in the construction of FIG. 27A and 27B reference numerals 4000 denotes an outer switch, 4001 denotes an inner switch, and 4010 and 4011 each denote a resistor. The switch 4000, the resistor 4010, the resistor 4011, and the switch 4001 are connected in series between a high voltage source V and a low voltage source −V. The connection point between the resistors 4010 and 4011 is connected to an input terminal of the adding circuit 401. The outer switch 4000 and the inner switch 4001 are respectively controlled by an outer signal and an inner signal which are respectively supplied from the MPU 500. When an active outer signal is output from the MPU 500, the outer switch 4000 is made on, and a high voltage signal is applied through the adding circuit 401 to the track traversing direction lens actuator 210' to move the writing/reading beam spot in the outer direction of the magneto-optical disc. Or when an active inner signal is output from the MPU 500, the inner switch 4001 is made on, and a low voltage signal is applied through the adding circuit 401 to the track traversing direction lens actuator 21' to move the writing/reading beam spot in the inner direction of the magneto-optical disc. The amount of the acceleration or deceleration is controlled by the duration of the active outer or inner signal.

Figure 29A:
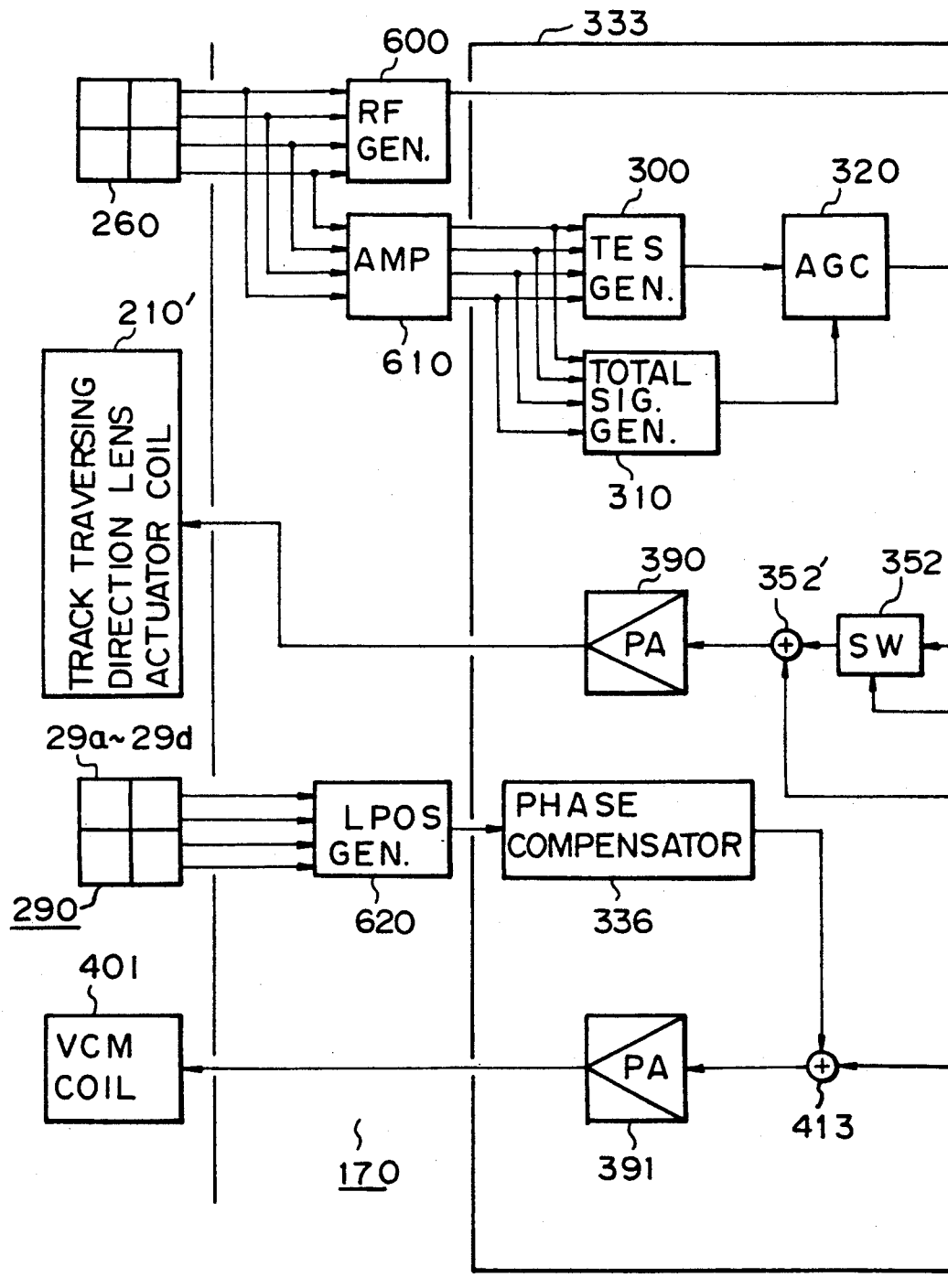
FIG. 29A and 29B show a construction for the track access control, including the head control circuit 335 and the erasing beam track access control circuit 333 of FIG. 26, in accordance with the seventh embodiment of the present invention.
Figure 29B:
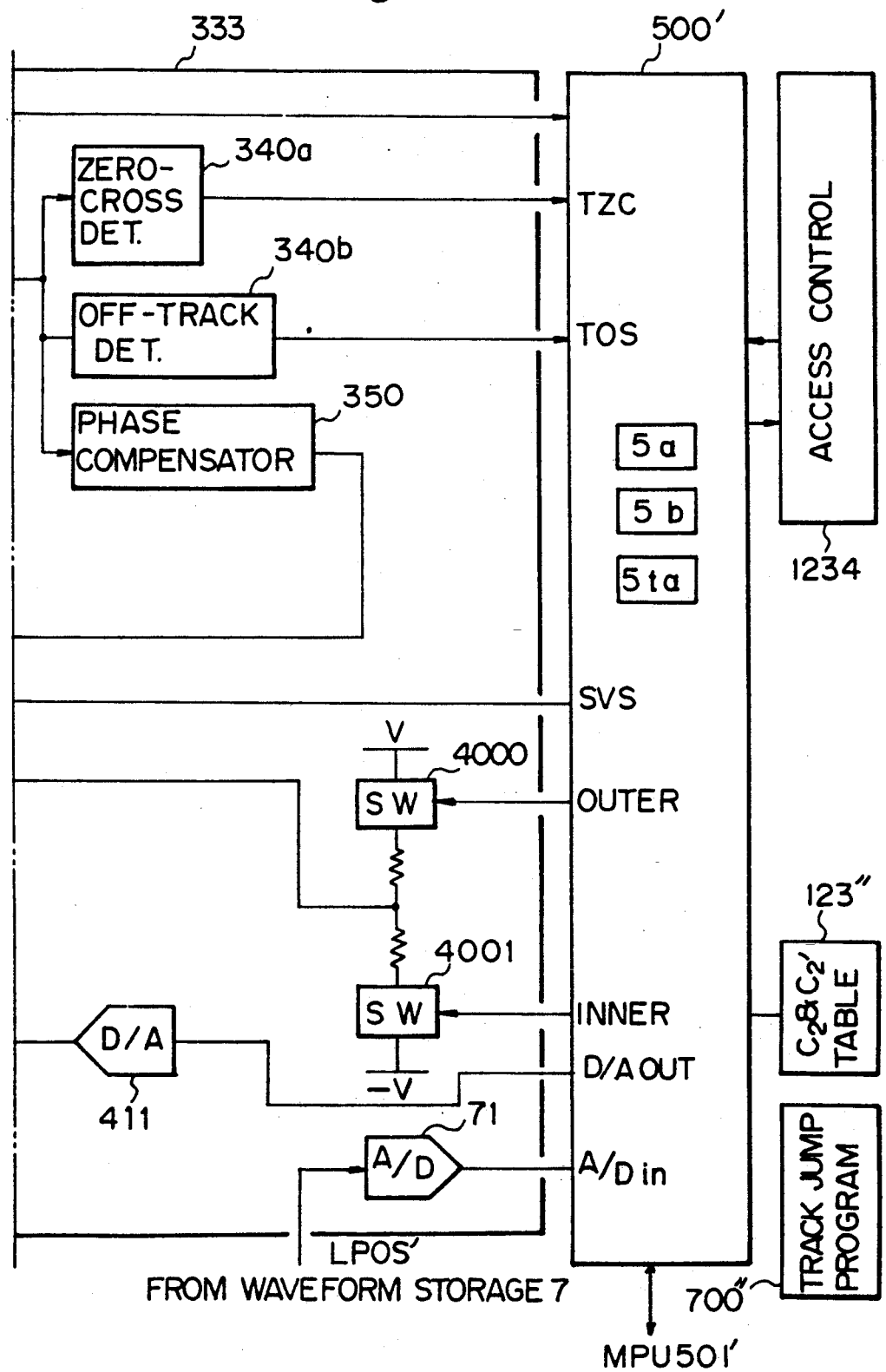

FIGS. 29A and 29B show a construct on for the track access control, including the head control circuit 335 and the erasing beam track access control circuit 333 of FIG. 26, in the seventh embodiment of the present invention. The construction of writing/reading beam track access control circuit 334 in the seventh embodiment of the present invention is not shown because it is the same as FIG. 28 for the above sixth embodiment of the present invention.

The constructions of the writing/reading beam track access control circuit 334, the construction of the head control circuit 335, and the waveform storage circuit 7 in FIGS. 29A and 29B, are the same as the constructions shown in FIGS. 27A and 27B except for the construction for driving the voice coil motor. In FIGS. 29A and 29B, the voice coil motor is controlled responding to the output of the lens position signal generation circuit 620 in the writing/reading beam moving mechanism 280', instead of the low frequency component of the track error signal TES which is obtained in the writing/reading beam moving mechanism 280'.

Similar to the construction of the sixth embodiment, in the construction of the seventh embodiment of the present invention, the track traversing direction lens position signal which is obtained from the lens position signal generation circuit 62 in the erasing beam moving mechanism 280, is input into the waveform storage circuit 7, instead of the track traversing direction lens position signal which is obtained from the lens position signal generation circuit in the writing/reading beam moving mechanism 280'.

In the above constructions of the sixth and seventh embodiments of the present invention corresponding to the third aspect of the present invention, a double servo operation is carried out at the position of the writing/reading beam, where the double servo operation consists of a first track servo loop using the track error signal TES which is obtained at the writing/reading beam and driving the track traversing direction lens actuator 210' for the writing/reading beam, and a second track servo loop using the low frequency component of the track error signal TES or the track traversing direction lens position signal which is obtained at the writing/reading beam, and driving the voice coil motor 81. At the same time, a third track servo operation is carried out using the track error signal TES which is obtained at the erasing beam, and driving the track traversing direction lens actuator 21' for the erasing beam.

In the above double servo operation, when the angular velocity of the magneto-optical disc is denoted by $\omega$, the phase difference between the erasing beam and the writing/reading beam is denoted by $\theta$, the radius of a track on which the erasing beam and the writing/reading beam are impinging, is r, and d is a maximum deviation of the radius of the track from the true circle having a radius r, the position of the writing/reading beam following a track can be approximately expressed by $$Xw = d\cdot\sin(\omega t) + r, \text{ and}$$

the position of the erasing beam following the track can be approximately expressed by $$Xe = d\cdot\sin(\omega t + \theta) + r.$$

Since the optical head 2' is moved by the above double servo operation, the relative position of the erasing beam regarding to the writing/reading beam is expressed by $$\begin{aligned}X_E - X_W &= d\cdot\sin(\omega t + \theta) + r - d\cdot\sin(\omega t) + r \\ &= -2d\cdot\cos(\omega t + \theta/2)\cdot\sin(\theta/2).\end{aligned}$$

On the other hand, the velocity of the writing/reading beam is expressed by $$Vw = V\cdot\cos(\omega t), \text{ and}$$

the velocity of the erasing beam is expressed by $$Ve = V\cdot\cos(\omega t + \theta),$$

where $V = d\omega$. The average velocity of the erasing beam and the writing/reading beam is expressed by $$\begin{aligned}(V_W + V_E)/2 &= [V\cdot\cos(\omega t) + V\cdot\cos(\omega t + \theta)]/2 \\ &= V\cdot\cos(\omega t + \theta/2)\cdot\cos(\theta/2).\end{aligned}$$

Figure 30:
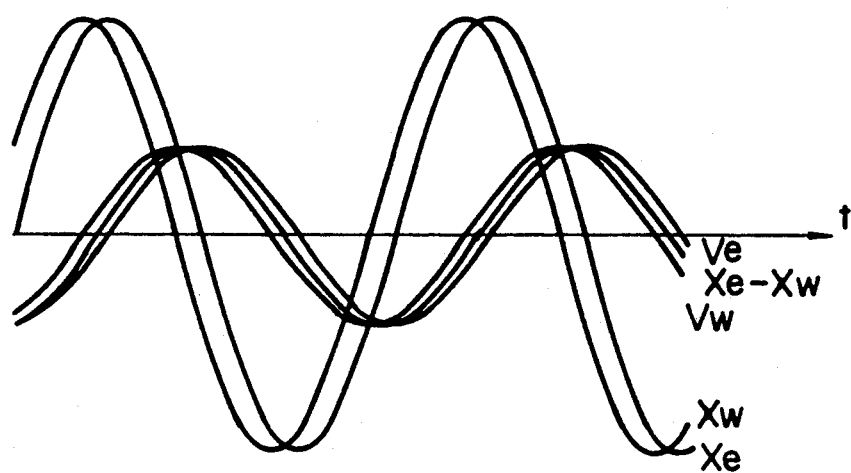
FIG. 30 shows the timing relationship between the positions of the erasing beam and the writing/reading beam and the average velocity of the erasing beam and the writing/reading beam.

Therefore, the above relative position of the erasing beam regarding to the writing/reading beam is proportional to the above average velocity of the erasing beam and the writing/reading beam as $$Xe - Xw = -1/\omega\cdot[\sin(\theta/2)/\cos(\theta/2)]\cdot(Vw + Ve)/2,$$

where $-1/\omega\cdot[\sin(\theta/2)/\cos(\theta/2)]$ is the proportional constant, and is a function of the address of the track because the distance between the erasing beam moving mechanism 280 and the writing/reading beam moving mechanism 280' and the angular velocity of $\omega$ of the magneto-optical disc. Namely, in the construction of the sixth and seventh embodiment, a quantity corresponding to the average velocity of the erasing beam and the writing/reading beam is memorized in the waveform storage circuit 7. FIG. 30 shows the timing relationship between the above quantities. Thus, in the track jump operation of the position of the writing/reading beam, a velocity command value can be modified by the information on the deformation (eccentricity) of the track at the phase preceding the phase of the writing/reading beam, and therefore, the error in the track jump control of the writing/reading beam can be reduced.

As shown in FIGS. 26, 27A, 27B, 28, 29A and 29B, the operation of the writing/reading beam track access control circuit 334, the head control circuit 335, and the waveform storage circuit 7, are controlled by the MPU 500, and the erasing beam track access control circuit 332 is controlled by the MPU 501, in the sixth or seventh embodiment. The control processes for the track jump operation by the MPU 500 is basically the same as the operation by the MPU 5" in FIGS. 18A and 18B in the third embodiment of the present invention, which is explained before with reference to FIGS. 15A, 15B and 19. Further, the MPU 501 controls the track jump operation by actuating the track traversing direction lens actuator 21' in the erasing beam moving mechanism 280 only. The control process for the track jump operation by actuating the track traversing direction lens actuator 21' in the erasing beam moving mechanism 280 is the same as the aforementioned operation of the steps 702' to 717' wherein the calculation in the step 708 is replaced with $A = C1/t + C2.i$, and the steps in the rectangle 734' is replaced with the process of FIG. 19, as in the third embodiment.

In the construction of the sixth and seventh embodiments, the constants C2 and C2' which are respectively used in the replaced step 708 and the step 709", varies with the radius of the track because the information on the track deformation (eccentricity) is obtained from the position of the erasing beam which precedes the writing/reading beam, and the phase difference between the positions of the erasing beam and the writing/reading beam varies with the radius of the track as explained before. Responding to the variation of the above constants C2 and C2', the values of the constants C2 and C2' for each, track are memorized in the table 123 of FIGS. 27A, 27B, 29A and 29B, and are used by the calculations by the MPU 500.

The track jump operation by actuating the track traversing direction lens actuator 21, in the erasing beam moving mechanism 280 which is controlled by the MPU 501, may be carried out in parallel with the track jump operation by actuating the track traversing direction lens actuator 210' in the writing/reading beam moving mechanism 280' which is controlled by the MPU 500, when a track jump operation of a small number of tracks is carried out. In the track jump operation by actuating the track traversing direction lens actuator 21' in the erasing beam moving mechanism 280, the calculation $A'' = C1''/t'' + C2''.i''$ is carried out corresponding to the calculation $A' = C1'/t' + C2'.i'$ in the step 709" of FIG. 19, where t" is the interval between the leading edges of the track zero-cross signal as shown in FIG. 20, and i" is the value which is sampled from the output of the waveform storage circuit 7. The constants C2" varies with the radius of the track by the above-mentioned reason. Responding to the variation of the constants C2", the values of the constants C2" for each track is memorized in the table 123, of FIG. 28, and is used by the calculation by the MPU 501 during the track jump operation by actuating the track traversing direction lens actuator 21' in the erasing beam moving mechanism 280.

What is claimed is:

1. A track access control system in a rotating disc storage device including a rotatable recording disc having a plurality of tracks which are formed in a direction of the rotation of the disc, and a data writing/reading head which impinges an optical beam onto the recording disc, and is movable in a radial direction across the disc, comprising:

head moving means for moving the data writing/reading head;

beam moving means, mounted on the data writing/reading head for moving an output position of said optical beam relative to the data writing/reading head;

track error detecting means for detecting a deviation of the position of said optical beam on the recording disc, from an optimum on-track position and for providing an output;

first driving control means for outputting a first control signal to control the operation of said head moving head in response to the output of said track error detecting means, so that said deviation is reduced during a track servo operation;

second driving control means for outputting a second control signal to control the operation of said optical beam moving means in response to the output of said track error detecting means, so that said deviation is reduced during a track servo operation;

waveform storing means for inputting and storing a waveform of said first control signal for at least one rotation cycle of the recording disc;

first track jump control means for outputting a third control signal to control said head moving means, so that said position of said beam moving means moves to a requested track;

second track jump control means for outputting a fourth control signal to control said beam moving means so that said position of said beam moving means moves to a requested track;

first jump control signal modifying means for modifying said third control signal by adding the stored data of said waveform storing means thereto, corresponding to a current rotation angle of the recording disc, during the track jump operation; and second jump control signal modifying means for modifying said fourth control signal by adding the stored data of said waveform storing means thereto, corresponding to the current rotation angle of the recording disc, during the track jump operation.

2. A track access control system according to claim 1, wherein said waveform storing means comprises:

a memory for storing the waveform of an input signal of said waveform storing means as delta modulated data;

writing/reading control means for controlling a timing of writing and reading data in said memory;

address generation means for generating addresses for writing and reading said delta modulated data in said memory, synchronizing with said timing of writing and reading data;

digital output integrating means for integrating successive digital outputs of said memory and providing an output; and a comparator, coupled to said digital output integrating means, for comparing said output of said digital output integrating means with said input signal, wherein the output of said comparator is input into said memory as said delta modulated data, and the output of said digital output integrating means is the output of said waveform storing means.

3. A track access control system in a rotating disc storage device including a rotatable recording disc having a plurality of tracks which are formed in a direction of the rotation of the disc, and a data writing/reading head which impinges an optical beam onto the recording disc, and is movable in a radial direction across the disc, comprising:

head moving means for moving the data writing/reading head;

beam moving means, mounted on the data writing/reading head, for moving an output position of said optical beam relative to the data writing/reading head;

track error detecting means for detecting a deviation of the position of said optical beam on the recording disc, from an optimum on-track position and for producing an output;

high-pass filter means for extracting a high frequency component of the output of said track error detecting means, and for providing an output;

low-pass filter means for extracting a low frequency component of the output of said track error detecting means, and for providing an output;

first driving control means for outputting a first control signal to control the operation of said head moving means in response to the output of said low-pass filter means, so that said deviation is reduced during a track servo operation;

second driving control means for outputting a second control signal to control the operation of said beam moving means in response to the output of said high-pass filter means so that said deviation is reduced during a track servo operation;

waveform storing means for inputting and storing a waveform of said first control signal for a rotation cycle of the recording disc;

first track jump control means for outputting a third control signal to control said head moving means, so that said position of said beam moving means moves to a requested track;

second track jump control means for outputting a fourth control signal to control said beam moving means so that said position of said beam moving means moves to a requested track;

first jump control signal modifying means for modifying said third control signal by adding the stored data of said waveform storing means thereto, corresponding to a current rotation angle of the recording disc, during the track jump operation; and second jump control signal modifying means for modifying said fourth control signal by adding the stored data of said waveform storing means thereto, corresponding to the current rotation angle of the recording disc, during the track jump operation.

4. A track access control system according to claim 3, and wherein said waveform storing means comprises;

a memory for storing the waveform of an input signal of said waveform storing means as delta modulated data;

writing/reading control means for controlling a timing of writing and reading data in said memory;

address generation means for generating addresses for writing and reading said delta modulated data in said memory synchronizing with said timing of writing and reading data;

digital output integrating means for integrating successive digital outputs of said memory and providing an output; and a comparator, coupled to said digital output integrating means for comparing said output of said digital output integrating means with said input signal, wherein the output of said comparator is input into said memory as said delta modulated data, and the output of said digital output integrating means is the output of said waveform storing means.

5. A track access control system in a rotating disc storage device including a rotatable recording disc having a plurality of tracks which are formed in a direction of the rotation of the disc, and a data writing/reading head which impinges an optical beam onto the recording disc, and is movable in a radial direction across the disc, comprising:

head moving means for moving the data writing/reading head;

beam moving means, mounted on the data writing/reading head, for moving an output position of said optical beam relative to the data writing/reading head;

beam displacement detecting means for detecting a displacement of the output position of said optical beam relative to a predetermined position on the data writing/reading head, and for providing an output;

track error detecting means for detecting a deviation of the position of said optical beam on the recording disc, from an optimum on-track position and for providing an output;

first driving control means for outputting a first control signal to control the operation of said head moving means in response to the output of said beam displacement detecting means so that said displacement is reduced during a track servo operation;

second driving control means for outputting a second control signal to control the operation of said beam moving means in response to the output of said track error detecting means so that said deviation is reduced during the track servo operation;

waveform storing means for storing a waveform of said first control quantity for a rotation cycle of the recording disc;

track jump control means for outputting a third control signal to control said head moving means and said beam moving means so that said position of the optical beam moves to a requested track; and jump control signal modifying means for modifying said third control signal by adding the stored data of said waveform storing means thereto, corresponding to a current rotation angle of the recording disc, during the track jump operation.

6. A track access control system according to claim 5, wherein said waveform storing means comprises:

a memory for storing the waveform of an input signal of said waveform storing means as delta modulated data;

writing/reading control means for controlling a timing of writing and reading data in said memory;

address generation means for generating addresses for writing and reading said delta modulated data in said memory, synchronizing with said timing of writing and reading data;

digital output integrating means for integrating successive digital outputs of said memory and providing an output; and a comparator, coupled to said digital output integrating means and coupled to receive said input signal, for comparing said output of said digital output integrating means with said input signal, wherein the output of said comparator is input into said memory as said delta modulated data, and the output of said digital output integrating means is the output of said waveform storing means.

7. A track access control system in a rotating disc storing device including a rotating disc having a plurality of tracks which are formed in a direction of the rotation of the disc, and a movable head which is movable in a radial direction across the disc for writing or reading on the disc;

said movable head containing first and second optical beam outputting means for impinging first and second optical beams, respectively, where the first optical beam outputting means is located in a position preceding the second optical beam outputting means in the direction of the rotation of the disc;

said track access control system comprising:

head moving means for moving said movable head in the radial direction across the disc;

first beam moving means, mounted on said movable head, for moving an output position of said first optical beam relative to said movable head;

second beam moving means, mounted on said movable head, for moving an output position of said second optical beam relative to said movable head;

first track error detecting means for detecting a deviation of the position of said first optical beam on the disc, from its optimum on-track position and for providing an output;

second track error detecting means for detecting a deviation of the position of said second optical beam on the disc, from its optimum on-track position and for providing an output;

first driving control means for outputting a first control signal to control the operation of said head moving means in response to the output of said first track error detecting means, so that said deviation detected in said first track error detecting means is reduced;

second driving control means for outputting a second control signal to control the operation of said first beam moving means in response to the output of said first track error detecting means, so that said deviation detected in said first track error detecting means is reduced; and third driving control means for outputting a third control signal to control the operation of said second beam moving means in response to the output of said second track error detecting means so that said deviation detected in said second track error detecting means is reduced.

8. A track access control system in a rotating disc storage device including a rotatable disc having a plurality of tracks which are formed in a direction of rotation of the disc, and a movable head which is movable in a radial direction across the disc for writing or reading data on the disc;
  said movable head containing first and second optical beam outputting means for impinging first and second optical beams, respectively, where the first optical beam outputting means is located in a position preceding the second optical beam outputting means in the direction of the rotation of the disc;
  said track access control system comprising:
    head moving means for moving said movable head in the radial direction across the disc;
    first beam moving means, mounted on said movable head, for moving an output position of said first optical beam relative to said movable head;
    second beam moving means, mounted on said movable head, for moving an output position of said second optical beam relative to said movable head;
    first track error detecting means for detecting a deviation of the position of said first optical beam on the disc, from its optimum on-track position and providing an output;
    second track error detecting means for detecting a deviation of the position of said second optical beam on the disc, from its optimum on-track position and providing an output;
    high-pass filter means for extracting a high frequency component of the output of said first track error detecting means;
    low-pass filter means for extracting a low frequency component of the output of said first track error detecting means;
    first driving control means for outputting a first control signal to control the operation of said head moving means in response to the output of said low-pass filter means, so that said deviation detected in said first track error detecting means is reduced;
    second driving control means for outputting a second control signal to control the operation of said first beam moving means in response to the output of said high-pass filter means, so that said deviation detected in said first track error detecting means is reduced; and
    third driving control means for outputting a third control signal to control the operation of said second beam moving means in response to the output of said second track error detecting means, so that said deviation detected in said second track error detecting means is reduced.

9. A track access control system in a rotating disc storage device including a rotatable disc having a plurality of tracks which are formed in a direction of the rotation of the disc, and a movable head which is movable in a radial direction across the disc for writing or reading data on the disc;
  said movable head containing first and second optical beam outputting means for impinging first and second optical beams, respectively, where the first optical beam outputting means is located in a position preceding the second optical beam outputting means in the direction of the rotation of the disc;
  said track access control system comprising:
    head moving means for moving said movable head in the radial direction across the disc;
    first beam moving means, mounted on said movable head, for moving an output position of said first optical beam, relative to said movable head;
    second beam moving means, mounted on said movable head, for moving an output position of said second optical beam relative to said movable head;
    first track error detecting means for detecting a deviation of the position of said first optical beam on the disc, from its optimum on-track position and for providing an output;
    second track error detecting means for detecting a deviation of the position of said second optical beam on the disc, from its optimum on-track position and for providing an output;
    first optical beam displacement detecting means for detecting a displacement of the output position of said first optical beam from a predetermined position on said movable head during the track servo operation and for providing an output;
    first driving control means for outputting a first control signal to control the operation of said head moving means in response to the output of said first optical beam displacement detecting means, so that said displacement detected in the first optical beam displacement detecting means is reduced during the track servo operation;
    second driving control means for outputting a second control signal to control the operation of said first beam moving means in response to the output of said first track error detecting means so that said deviation detected in the first track error detecting means is reduced; and
    third driving control means for outputting a third control signal to control the operation of said second beam moving means in response to the output of said second track error detecting means so that said deviation detected in the second track error detecting means is reduced.

10. A track access control system in a rotation disc storage device including a rotatable disc having a plurality of tracks which are formed in a direction of the rotation of the disc, and a movable head which is movable in a radial direction across the disc for writing or reading data on the disc;
  said movable head containing first and second optical beam outputting means for impinging first and second optical beams, respectively, where the first optical beam outputting means is located in a position preceding the second optical beam outputting means in the direction of the rotation of the disc;
  said track access control system comprising:
    head moving means for moving said movable head in the radial direction across the disc;
    first beam moving means, mounted on said movable head, for moving an output position of said first optical beam relative to said movable head;
    second beam moving means, mounted on said movable head, for moving an output position of said second optical beam relative to said movable head;
    first track error detecting means for detecting a deviation of the position of said first optical beam on the disc, from its optimum on-track position during a track servo operation and for providing an output;
    second track error detecting means for detecting a deviation of the position of said second optical beam on the disc, from its optimum on-track position during the track servo operation and for providing an output;

first optical beam displacement detecting means for detecting a displacement of the output position of said first optical beam from a predetermined position on said movable head during the track servo operation and for providing an output;

first driving control means for outputting a first control signal to control the operation of said head moving means in response to the output of said second track error detecting means, so that said deviation detected in said second track error detecting means is reduced during the track servo operation;

second driving control means for outputting a second control signal to control the operation of said second beam moving means in response to the output of said second track error detecting means, so that said deviation detected in said second track error detecting means is reduced during the track servo operation;

third driving control means for outputting a third control signal to control the operation of said first beam moving means in response to the output of said first track error detecting means, so that said deviation detected in said first track error detecting means is reduced during the track servo operation;

waveform storing means for storing a waveform of the output of said first optical beam displacement detecting means for a rotation cycle of said recording disc;

track jump control means for outputting a fourth control signal to control said head moving means, said first beam moving means, and said second beam moving means, so that said position of the first optical beam and the second optical beam move to a requested track; and jump control signal modifying means for modifying said fourth control signal by adding the stored data of said waveform storing means thereto, corresponding to a current rotation angle of the disc, during the track jump operation.

11. A track access control system according to claim 10, wherein said waveform storing means comprises:

a memory for storing the waveform of said input signal of said waveform storing means as delta modulated data;

writing/reading control means for controlling a timing of writing and reading data in said memory;

address generation means for generating addresses for writing and reading said delta modulated data in said memory, synchronizing with said timing of writing and reading data;

digital output integrating means for integrating successive digital outputs of said memory and providing an output; and a comparator, coupled to said digital output integrating means and coupled to receive said input signal, for comparing said output of said digital output integrating means with said input signal, wherein the output of said comparator is input into said memory as said delta modulated data, and the output of said digital output integrating means is the output of said waveform storing means.

12. A track access control system in a rotating disc storage device including a rotatable disc having a plurality of tracks which are formed in a direction of the rotation of the disc, and a movable head which is movable in a radial direction across the disc for writing or reading data on the disc;

said movable head containing first and second optical beam outputting means for impinging first and second optical beams, respectively, where the first optical beam outputting means is located in a position preceding the second optical beam outputting means in the direction of the rotation of the disc;

said track access control system comprising:

head moving means for moving said movable head in the radial direction across the disc;

first beam moving means, mounted on said movable head, for moving an output position of said first optical beam relative to said movable head;

second beam moving means, mounted on said movable head, for moving an output position of said second optical beam relative to said movable head;

first track error detecting means for detecting a deviation of the position of said first optical beam on the disc, from its optimum on-track position during a track servo operation and for providing an output;

second track error detecting means for detecting a deviation of the position of said second optical beam on the disc, from its optimum on-track position during the track servo operation and for providing an output;

high-pass filter means for extracting a high frequency component of the output of said second track error detecting means;

low-pass filter means for extracting a low frequency component of the output of said second track error detecting means;

first optical beam displacement detecting means for detecting a displacement of the output position of said first optical beam from a predetermined position on said movable head during the track servo operation and for providing an output;

first driving control means for outputting a first control signal to control the operation of said head moving means in response to the output of said low-pass filter means, so that said deviation detected in said second track error detecting means is reduced during the track servo operation;

second driving control means for outputting a second control signal to control the operation of said second beam moving means in response to the output of said high-pass filter means, so that said deviation detected in said second track error detecting means is reduced during the track servo operation;

third driving control means for outputting a third control signal to control the operation of said first beam moving means in response to the output of said first track error detecting means, so that said deviation detected in said first track error detecting means is reduced during the track servo operation;

waveform storing means for storing a waveform of the output of said first optical beam displacement detecting means for a rotation cycle of said recording disc;

track jump control means for outputting a fourth control signal to control said head moving means, said first beam moving means, and said second beam moving means, so that said position of the first optical beam and the second optical beam move to a requested track; and jump control signal modifying means for modifying said fourth control signal by adding the stored data of said waveform storing means thereto, corresponding to a current rotation angle of the disc, during the track jump operation.

13. A track access control system according to claim 12, wherein said waveform storing means comprises:

a memory for storing the waveform of said input signal of said waveform storing means as delta modulated data;

writing/reading control means for controlling a timing or writing and reading data in said memory;

address generation means for generating addresses for writing and reading said delta modulated data in said memory, synchronizing with said timing of writing and reading data;

digital output integrating means for integrating successive digital outputs of said memory and providing an output; and a comparator, coupled to said digital output integrating means and coupled to receive said input signal, for comparing said output of said digital output integrating means with said input signal, wherein the output of said comparator is input into said memory as said delta modulated data, and the output of said digital output integrating means is the output of said waveform storing means.

14. A track access control system in a rotating disc storage device including a rotatable disc having a plurality of tracks which are formed in a direction of the rotation of the disc, and a movable head which is movable in a radial direction across the disc for writing or reading data on the disc;

said movable head containing first and second optical beam outputting means for impinging first and second optical beams, respectively, where the first optical beam outputting means is located in a position preceding the second optical beam outputting means in the direction of the rotation of the disc;

said track access control system comprising:

head moving means for moving said movable head in the radial direction across the disc;

first beam moving means, mounted on said movable head, for moving an output position of said first optical beam relative to said movable head;

second beam moving means, mounted on said movable head, for moving an output position of said second optical beam relative to said movable head;

first track error detecting means for detecting a deviation of the position of said first optical beam on the disc, from its optimum on-track position during a track servo operation and for providing an output;

second track error detecting means for detecting a deviation of the position of said second optical beam on the disc, from its optimum on-track position during the track servo operation and for providing an output;

first optical beam displacement detecting means for detecting a displacement of the output position of said first optical beam from a predetermined position on said movable head during the track servo operation and for providing an output;

second optical beam displacement detecting means for detecting a displacement of the output position of said second optical beam from a predetermined position on said movable head during the track servo operation and for providing an output;

first driving control means for outputting a first control signal to control the operation of said head moving means in response to the output of said second optical beam displacement detecting means, so that said displacement detected in said second optical beam displacement detecting means is reduced during the track servo operation;

second driving control means for outputting a second control signal to control the operation of said first beam moving means in response to the output of said first track error detecting means, so that said deviation detected in said first track error detecting means is reduced during the track servo operation;

third driving control means for outputting a third control signal to control the operation of said second beam moving means in response to the output of said second track error detecting means, so that said deviation detected in said second track error detecting means is reduced during the track servo operation;

waveform storing means for storing a waveform of the output of said first optical beam displacement detecting means for a rotation cycle of said recording disc;

track jump control means for outputting a fourth control signal to control said head moving means, said first beam moving means, and said second beam moving means, so that said positions of the first optical beam and the second optical beam move to a requested track; and jump control signal modifying means for respectively modifying said fourth control signal by adding the stored data of said waveform storing means thereto, corresponding to a current rotation angle of the disc, during the track jump operation.

15. A track access control system according to claim 14, wherein said waveform storing means comprises:

a memory for storing the waveform of said input signal of said waveform storing means as delta modulated data;

writing/reading control means for controlling a timing of writing and reading data in said memory;

address generation means for generating addresses for writing and reading said delta modulated data in said memory, synchronizing with said timing of writing and reading data;

digital output integrating means for integrating successive digital outputs of said emory and providing an output; and a comparator, coupled to said digital output integrating means and coupled to receive said input signal, for comparing said output of said digital output integrating means with said input signal, wherein the output of said comparator is input into said memory as said delta modulated data, and the output of said digital output integrating means is the output of said waveform storing means.

16. A track access control system in a rotating disc storage device including a rotatable disc having a plurality of tracks which are formed in a direction of the rotation of the disc, and a movable head which is movable in a radial direction across the disc for writing or reading data on the disc;

said movable head containing erasing means for erasing data which is written on a track of the disc by impinging an erasing beam, and data writing/reading means for writing or reading data on the track by impinging a writing beam or a reading beam, where the erasing means is located in a position preceding the data writing/reading means in the direction of the rotation of the disc;

said track access control system comprising:
head moving means for moving said movable head in the radial direction across the disc;
erasing beam moving means, mounted on said movable head, for moving an output position of said erasing beam relative to said movable head;
writing/reading beam moving means, mounted on said movable head, for moving an output position of said writing beam or said reading beam relative to said movable head;
first track error detecting means for detecting a deviation of the position of said erasing beam on the disc, from its optimum on-track position and for providing an output;
second track error detecting means for detecting a deviation of the position of said writing beam or said reading beam on the disc, from its optimum on-track position and for providing an output;
first driving control means for outputting a first control signal to control the operation of said head moving means in response to the output of said first track error detecting means, so that said deviation detected in said first track error detecting means is reduced;
second driving control means for outputting a second control signal to control the operation of said erasing beam moving means in response to the output of said first track error detecting means, so that said deviation detected in the first track error detecting means is reduced; and
third driving control means for outputting a third control signal to control the operation of said writing/reading beam moving in response to the output of said second track error detecting means, so that said deviation detected in said second track error detecting means is reduced.

17. A track access control system in a rotating disc storage device including a rotatable disc having a plurality of tracks which are formed in a direction of the rotation of the disc, and a movable head which is movable in a radial direction across the disc for writing or reading data on the disc;

said movable head containing erasing means for erasing data which is written on a track of the disc by impinging an erasing beam, and data writing/reading means for writing or reading data on the track by impinging a writing beam or a reading beam, where the erasing means is located in the position preceding the data writing/reading means in the direction of the rotation of the disc;

said track access control system comprising:
head moving means for moving said movable head in the radial direction across the disc;
erasing beam moving means, mounted on said movable head, for moving an output position of said erasing beam relative to said movable head;
writing/reading beam moving means, mounted on said movable head, for moving an output position of said writing beam or said reading beam relative to said movable head;
first track error detecting means for detecting a deviation of the position of said erasing beam on the disc, from its optimum on-track position and for providing an output;
second track error detecting means for detecting a deviation of the position of said writing beam or reading beam on the disc, from its optimum on-track position and for providing an output;
high-pass filter means for extracting a high frequency component of the output of said first track error detecting means and for providing an output;
low-pass filter means for extracting a low frequency component of the output of said first track error detecting means and for providing an output;
first driving control means for outputting a first control signal to control the operation of said head moving means in response to the output of said low-pass filter means, so that said deviation detected in the first track error detecting means is reduced;
second driving control means for outputting a second control signal to control the operation of said erasing beam moving means in response to the output of said high-pass filter means, so that said deviation detected in the first track error detecting means is reduced; and
third driving control means for outputting a third control signal to control the operation of said writing/reading beam moving means in response to the output of said second track error detecting means, so that said deviation detected in the second track error detecting means is reduced.

18. A track access control system in a rotation disc storage device including a rotatable disc having a plurality of tracks which are formed in a direction of the rotation of the disc, and a movable head which is movable in a radial direction across the disc for writing or reading data on the disc;

said movable head containing erasing means for erasing data which is written on a track of the disc by impinging an erasing beam, and data writing/reading means for writing or reading data on the track by impinging a writing beam or a reading beam, where the erasing means is located in a position preceding the data writing/reading means in the direction of the rotation of the disc;

said track access control system comprising:
head moving means for moving said movable head in the radial direction across the disc;
erasing beam moving means, mounted on said movable head, for moving an output position of the erasing beam relative to said movable head;
writing/reading beam moving means, mounted on said movable head, for moving an output position of said writing beam or said reading beam relative to said movable head;
first track error detecting means for detecting a deviation of the position of said erasing beam on the disc, from its optimum on-track position and for providing an output;
second track error detecting means for detecting a deviation of the position of said writing beam or said reading beam on the disc, from its optimum on-track position and for providing an output;

erasing beam displacement detecting means for detecting a displacement of the output position of said erasing beam from a predetermined position on said movable head during the track servo operation and for providing an output;

first driving control means for outputting a first control signal to control the operation of said head moving means in response to the output of said erasing beam displacement detecting means, so that said displacement detected in said erasing beam displacement detecting means is reduced during the track servo operation;

second driving control means for outputting a second control signal to control the operation of said erasing beam moving means in response to the output of said first track error detecting means, so that said deviation detected in said first track error detecting means is reduced; and third driving control means for outputting a third control signal to control the operation of said writing/reading beam moving means in response to the output of said second track error detecting means, so that said deviation detected in said second track error detecting means is reduced.

19. A track access control system in a rotating disc storage device including a rotatable disc having a plurality of tracks which are formed in a direction of the rotation of the disc, and a movable head which is movable in a radial direction across the disc for writing or reading data on the disc;

said movable head containing erasing means for erasing data which is written on a track of the disc by impinging an erasing beam, and data writing reading means for writing or reading data on the track by impinging a writing or reading beam, wherein the erasing means is located in a position preceding the data writing/reading means in the direction of the rotation of the disc;

said track access control system comprising:

head moving means for moving said movable head in the radial direction across the disc;

erasing beam moving means, mounted on said movable head, for moving an output position of said erasing beam relative to said movable head;

writing/reading beam moving means, mounted on said movable head, for moving an output position of said writing beam or said reading beam relative to said movable head;

first track error detecting means for detecting a deviation of the position of said erasing beam on the disc, form its optimum on-track position during a track servo operation and for providing an output;

second track error detecting means for detecting a deviation of the position of said writing beam or said reading beam on the disc, from its optimum on-track position during the track servo operation and for providing an output;

erasing beam displacement detecting means for detecting a displacement of the output position of said erasing beam from a predetermined position on said movable head during the track servo operation and for providing an output;

first driving control means for outputting a first control signal to control the operation of said head moving means in response to the output of said second track error detecting means, so that said deviation detected in the second track error detecting means is reduced during the track servo operation;

second driving control means for outputting a second control signal to control the operation of said writing/reading beam moving means in response to the output of said second track error detecting means, so that said deviation detected in said second track error detecting means is reduced during the track servo operation;

third driving control means for outputting a third control signal to control the operation of said erasing beam moving means in response to the output of said first track error detecting means so that said deviation detected in said first track error detecting means is reduced during the track servo operation;

waveform storing means for storing a waveform of the output of said erasing beam displacement detecting means for a rotation cycle of the disc;

track jump control means for outputting a fourth control signal to control said head moving means, said erasing beam moving means, and said writing/reading beam moving means, so that said position of the reading beam and the writing beam or the reading beam move to a requested track; and jump control signal modifying means for modifying said fourth control quantity of adding the stored data of said waveform storing means thereto, corresponding to a current rotation angle of the disc, during the track jump operation.

20. A track access control system according to claim 19, wherein said waveform storing means comprises:

a memory for storing the waveform of said input signal of said waveform storing means as delta modulated data;

writing/reading control means for controlling a timing of writing and reading data in said memory;

address generation means for generating addresses for writing and reading said delta modulated data in said memory, synchronizing with said timing of writing and reading data;

digital output integrating means for integrating successive digital outputs of said memory and providing an output; and a comparator, coupled to said digital output integrating means and coupled to receive said input signal, for comparing an output of said digital output integrating means with said input signal, wherein the output of said comparator is input into said memory as said delta modulated data, and the output of said digital output integrating means is the output of said waveform storing means.

21. A track access control system in a rotating disc storage device including a rotatable disc having a plurality of track which are formed in a direction of the rotation of the disc, and a movable head which is movable in a radial direction across the disc for writing or reading data on the disc;

said movable head containing erasing means for erasing data which is written on a track of the disc by impinging an erasing beam, and data writing/reading means for writing or reading data on the track by impinging a writing or reading beam, where the erasing means is located in a position preceding the data writing/reading means in the direction of the rotation of the disc;

said track access control system comprising:

head moving means for moving said movable head in the radial direction across the disc;

erasing beam moving means, mounted on said movable head, for moving an output position of said erasing beam relative to said movable head;

writing/reading beam moving means, mounted on said movable head, for moving an output position of said writing beam or said reading beam relative to said movable head;

first track error detecting means for detecting a deviation of the position of said erasing beam on the disc, from its optimum on-track position during a track servo operation and for providing an output;

second track error detecting means for detecting a deviation of the position of said writing beam or said reading beam on the disc, from its optimum on-track position during the track servo operation and for providing an output;

high-pass filter means for extracting a high frequency component of the output of said second track error detecting means and for providing an output;

low-pass filter means for extracting a low frequency component of the output of said second track error detecting means and for providing an output;

erasing beam displacement detecting means for detecting a displacement of the output position of said erasing beam from a predetermined position on said movable head during the track servo operation and for providing an output;

first drive control means for outputting a first control signal to control the operation of said head moving means in response to the output of said low-pass filter means, so that said deviation detected in said second track error detecting means is reduced during the track servo operation;

second driving control means for outputting a second control signal to control the operation of said writing/reading beam moving means in response to the output of said high-pass filter means, so that said deviation detected in said second track error detecting means is reduced during the track servo operation;

third driving control means for outputting a third control signal to control the operation of said erasing beam moving means in response to the output of said first track error detecting means, so that said deviation detected in said first track error detecting means is reduced during the track servo operation;

waveform storing means for storing a waveform of the output of said erasing beam displacement detecting means for a rotation cycle of the disc;

track jump control means for outputting a fourth control signal to control said head moving means, said erasing beam moving means, and said writing/reading beam moving means, so that said position of the erasing beam and the writing beam or the reading beam move to a requested tracked; and jump control signal modifying means for modifying said fourth control signal by adding the stored data of said waveform storing means thereto, corresponding to a current rotation angle of the disc, during the track jump operation.

22. A track access control system according to claim 21, wherein said waveform storing means comprises:

a memory for storing the waveform of said input signal of said waveform storing means as delta modulated data;

writing/reading control means for controlling a timing of writing and reading data in said memory;

address generation means for generating addresses for writing and reading said delta modulated data in said memory, synchronizing with said timing of writing and reading data;

digital output integrating means for integrating successive digital outputs of said memory; and a comparator, coupled to said digital output integrating means and coupled to receive said input signal, for comparing an output of said digital integrating means with said input signal, wherein the output of said comparator is input into said memory as said delta modulated data, and the output of said digital output integrating means is the output of said waveform storing means.

23. A track access control system in a rotating disc storage device including a rotatable disc having a plurality of tracks which are formed in a direction of the rotation of the disc, and a movable head which is movable in a radial direction across the disc for writing or reading data on the disc;

said movable head containing erasing means for erasing data which is written on a track of the disc by impinging an erasing beam, and data writing/reading means for writing or reading data on the track by impinging a writing beam or a reading beam, where the erasing means is located in a position preceding the data writing/reading means in the direction of the rotation of the disc;

said track access control system comprising:

head moving means for moving said movable head in the radial direction across the disc;

erasing beam moving means, mounted on said movable head, for moving an output position of said erasing beam relative to said movable head;

writing/reading beam moving means, mounted on said movable head, for moving an output position of said writing beam or reading beam relative to said movable head;

first track error detecting means for detecting a deviation of the position of said erasing beam on the disc, from its optimum on-track position during a track servo operation and for providing an output;

second track error detecting means for detecting a deviation of the position of said writing beam or said reading beam on the disc, from its optimum on-track position during the track servo operation and for providing an output;

erasing beam displacement detecting means for detecting a displacement of the output position of said erasing beam from a predetermined position on said movable head during the track servo operation and for providing an output;

writing/reading beam displacement detecting means for detecting a displacement of the output position of said writing beam or reading beam from a predetermined position on said movable head during the track servo operation and for providing an output;

first driving control means for outputting a first control signal to control the operation of said head moving means in response to the output of said writing/reading beam displacement detecting means, so that said displacement detected in the writing/reading beam displacement detecting means is reduced during the track servo operation;

second driving control means for outputting a second control signal to control the operation of said erasing beam moving means in response to the output of said first track error detecting means, so that said deviation detected in said first track error detecting means is reduced during the track servo operation;

third driving control means for outputting a third control signal to control the operation of said writing/reading beam moving means in response to the output of said second track error detecting means, so that said deviation detected in said second track error detecting means is reduced during the track servo operation;

waveform storing means for storing a waveform of the output of said erasing beam displacement detecting means for a rotation cycle of the disc;

track jump control means for outputting a fourth control signal to control said head moving means, said erasing beam moving means, and said writing/reading beams moving means, so that said positions of the reading beam and the writing beam or the reading beam move to a requested track; and jump control signal modifying means for respectively modifying said fourth control signal by adding the stored data of said waveform storing means thereto, corresponding to a current rotation angle of the disc, during the track jump operation.

24. A track access control system according to claim 23, wherein said waveform storing means comprises:
a memory for storing the waveform of said input signal of said waveform storing means as delta modulated data;
writing/reading control means for controlling a timing of writing and reading data in said memory;
address generation means for generating addresses for writing and reading said delta modulated data in said memory, synchronizing with said timing or writing and reading data;
digital output integrating means for integrating successive digital outputs of said memory; and
a comparator, coupled to said digital output integrating means and coupled to receive said input signal, for comparing an output of said digital output integrating means with said input signal,
wherein the output of said comparator is input into said memory as said delta modulated data, and the output of said digital output integrating means is the output of said waveform storing means.

25. A rotating disc storage device for use with a rotatable disc having a plurality of tracks which are formed in a direction of the rotation of the disc, comprising:
a data writing/reading head movable in a radial direction across the disc, for emitting an optical beam onto the disc;
first means for moving said data writing/reading head;
second means for moving the position of the optical beam relative to said data writing/reading head;
third means for detecting a deviation of the position of the emitted optical beam on the disc, from a predetermined position, and for providing an output;
fourth means for outputting a first control signal to control the operation of said first means in response to the output of said third means, so that the deviation is reduced during a track servo operation;
fifth means for storing a waveform of the first control signal for a rotation cycle of the recording disc;
sixth means for outputting a second control signal to control said first means and said second means, so that the position of the emitted optical beam moves to a requested track; and
seventh means for modifying the second control signal by adding the stored data corresponding to a current rotation angle of the recording disc, during a track jump operation.

* * * * *

UNITED STATES PATENT AND TRADEMARK OFFICE
CERTIFICATE OF CORRECTION

PATENT NO. : 5,163,033

DATED : NOVEMBER 10, 1992

INVENTOR(S) : SHIGENORI YANAGI

It is certified that error appears in the above-identified patent and that said Letters Patent is hereby corrected as shown below:

TITLE PAGE [56] U.S. PATENT DOCUMENTS, before line 1, insert
--4,752,922  6/1988  MacAnally et al.--.

TITLE PAGE [56] FOREIGN PATENT DOCUMENTS, before line 1, insert  --0227044  7/1987  Europe.
3804701  9/1988  Germany.--.

TITLE PAGE [56] OTHER PUBLICATIONS, after line 3, insert
--Patent Abstracts of Japan, Unexamined Application, P. field, Vol. 11, No. 274, September 5, 1977, The Patent Office Japanese Government, p. 111, p.612, Kokai No. 62-73436 (HITACHI LTD)--.

TITLE PAGE [57] ABSTRACT, line 5, "am" should be --an--.

Col. 6, line 12, "in the" should be --in accordance with the--.

Col. 20, line 4, "same" should be --same as the--.

Col. 21, line 38, "280," should be --280'--.

UNITED STATES PATENT AND TRADEMARK OFFICE
CERTIFICATE OF CORRECTION

PATENT NO. : 5,163,033

DATED : NOVEMBER 10, 1992

INVENTOR(S) : SHIGENORI YANAGI

It is certified that error appears in the above-identified patent and that said Letters Patent is hereby corrected as shown below:

Col. 23, line 44, "280," should be --280'--.

Col. 24, line 32, "construct on" should be --construction--.

Col. 26, line 67, "123," should be --123'--.

Col. 36, line 57, "emory" should be --memory--.

Signed and Sealed this

Thirtieth Day of November, 1993

Attest:

BRUCE LEHMAN

*Attesting Officer*  *Commissioner of Patents and Trademarks*